United States Patent
Nito et al.

(10) Patent No.: US 7,517,073 B2
(45) Date of Patent: *Apr. 14, 2009

(54) LIQUID COMPOSITION, SET OF LIQUID COMPOSITION AND INK, INK JET RECORDING APPARATUS, AND IMAGE FORMING METHOD

(75) Inventors: Yasuhiro Nito, Yokohama (JP); Shinichi Hakamada, Kawasaki (JP); Koromo Shirota, Kawasaki (JP); Kenji Shinjo, Yokohama (JP); Yutaka Kurabayashi, Tokyo (JP); Masashi Tsujimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

This patent is subject to a terminal disclaimer.

(21) Appl. No.: 11/225,344

(22) Filed: Sep. 14, 2005

(65) Prior Publication Data
US 2006/0007289 A1    Jan. 12, 2006

Related U.S. Application Data

(63) Continuation of application No. PCT/JP2005/005293, filed on Mar. 16, 2005.

(30) Foreign Application Priority Data

Mar. 16, 2004 (JP) ............................. 2004-075382
Mar. 11, 2005 (JP) ............................. 2005-070016

(51) Int. Cl.
C09D 11/00 (2006.01)
(52) U.S. Cl. .................................... 347/100; 106/31.13
(58) Field of Classification Search .................. 347/100; 106/31.13
See application file for complete search history.

(56) References Cited

U.S. PATENT DOCUMENTS 4,804,411 A    2/1989  Eida et al. .................. 106/22

(Continued)

FOREIGN PATENT DOCUMENTS

JP    S63-60783    3/1988

(Continued)

OTHER PUBLICATIONS

International Preliminary Report on Patentability and Written Opinion of the International Searching Authority for PCT/JP2005/005293, with translations (12 pages).
Oct. 1, 2008 European Supplementary Search Report in European Patent Appln. No. 05721343.1.

*Primary Examiner*—Manish S Shah
*Assistant Examiner*—Laura E Martin
(74) *Attorney, Agent, or Firm*—Fitzpatrick, Cella, Harper & Scinto

(57) ABSTRACT

To suppress curling phenomenon of a recording medium to which a liquid composition is applied while securing ejection stability. A liquid composition for used in an image recording method including the steps of applying an ink containing a colorant in a dissolved state or a dispersed state to a recording medium and applying to the recording medium a liquid composition which destabilizes the dissolved state or the dispersed state of the colorant in the ink by coming into contact with the ink, the liquid composition including at least a polyvalent metal ion, water, and water-soluble organic compounds 1 and 2, in which a content X (mass %) of the water-soluble organic compound 1 in the liquid composition is 15 mass % or more, and the content X (mass %) of the water-soluble organic compound 1 in the liquid composition and a content Y (mass %) of the water-soluble organic compound 2 in the liquid composition satisfy a specific relationship.

12 Claims, 7 Drawing Sheets

U.S. PATENT DOCUMENTS

| | | | |
|---|---|---|---|
| 4,864,324 A | 9/1989 | Shirota et al. | 346/1.1 |
| 5,059,246 A | 10/1991 | Yamamoto et al. | 106/22 |
| 5,074,914 A | 12/1991 | Shirota et al. | 106/22 |
| 5,081,470 A | 1/1992 | Kurabayashi et al. | 346/1.1 |
| 5,110,356 A | 5/1992 | Shirota et al. | 106/22 |
| 5,118,351 A | 6/1992 | Shirota et al. | 106/22 |
| 5,123,960 A | 6/1992 | Shirota et al. | 106/22 |
| 5,124,201 A | 6/1992 | Kurabayashi et al. | 428/323 |
| 5,135,570 A | 8/1992 | Eida et al. | 106/22 |
| 5,135,571 A | 8/1992 | Shirota et al. | 106/22 |
| 5,137,778 A | 8/1992 | Nakatsugawa et al. | 428/330 |
| 5,139,573 A | 8/1992 | Yamamoto et al. | 106/22 |
| 5,141,558 A | 8/1992 | Shirota et al. | 106/22 |
| 5,151,128 A | 9/1992 | Fukushima et al. | 106/20 |
| 5,171,626 A | 12/1992 | Nagamine et al. | 428/212 |
| 5,190,581 A | 3/1993 | Fukushima et al. | 106/20 D |
| 5,216,437 A | 6/1993 | Yamamoto et al. | 346/1.1 |
| 5,220,347 A | 6/1993 | Fukushima et al. | 346/1.1 |
| 5,221,333 A | 6/1993 | Shirota et al. | 106/20 D |
| 5,231,417 A | 7/1993 | Shirota et al. | 346/1.1 |
| 5,246,774 A | 9/1993 | Sakaki et al. | 428/323 |
| 5,248,991 A | 9/1993 | Shirota et al. | 346/1.1 |
| 5,250,121 A | 10/1993 | Yamamoto et al. | 106/22 R |
| 5,254,157 A | 10/1993 | Koike et al. | 106/20 D |
| 5,258,066 A | 11/1993 | Kobayashi et al. | 106/22 R |
| 5,277,962 A | 1/1994 | Nakatsugawa et al. | 428/206 |
| 5,296,022 A | 3/1994 | Kobayashi et al. | 106/20 D |
| 5,329,305 A | 7/1994 | Fukushima et al. | 347/95 |
| 5,356,464 A | 10/1994 | Hickman et al. | 106/20 R |
| 5,358,558 A | 10/1994 | Yamamoto et al. | 106/22 R |
| 5,362,558 A | 11/1994 | Sakaki et al. | 428/323 |
| 5,415,686 A | 5/1995 | Kurabayashi et al. | 106/26 R |
| 5,427,611 A | 6/1995 | Shirota et al. | 106/22 A |
| 5,439,515 A | 8/1995 | Kurabayashi et al. | 106/20 R |
| 5,500,023 A | 3/1996 | Koike et al. | 8/499 |
| 5,515,093 A | 5/1996 | Haruta et al. | 347/101 |
| 5,518,534 A | 5/1996 | Pearlstine et al. | 106/20 R |
| 5,526,031 A | 6/1996 | Kurabayashi | 347/105 |
| 5,540,764 A | 7/1996 | Haruta et al. | 106/20 R |
| 5,549,740 A | 8/1996 | Takahashi et al. | 106/20 R |
| 5,580,373 A | 12/1996 | Lane et al. | 106/20 R |
| 5,593,757 A | 1/1997 | Kashiwazaki et al. | 428/195 |
| 5,606,356 A | 2/1997 | Noguchi et al. | 347/100 |
| 5,614,007 A | 3/1997 | Kurabayashi et al. | 106/22 R |
| 5,618,338 A | 4/1997 | Kurabayashi et al. | 106/26 R |
| 5,621,447 A | 4/1997 | Takizawa et al. | 347/88 |
| 5,623,294 A | 4/1997 | Takizawa et al. | 347/98 |
| 5,624,484 A | 4/1997 | Takahashi et al. | 106/31.75 |
| 5,640,187 A | 6/1997 | Kashiwazaki et al. | 347/101 |
| 5,651,814 A | 7/1997 | Shimomura et al. | 106/31.36 |
| 5,658,376 A | 8/1997 | Noguchi et al. | 106/31.43 |
| 5,680,165 A | 10/1997 | Takizawa et al. | 347/88 |
| 5,695,820 A * | 12/1997 | Davis et al. | 427/261 |
| 5,696,182 A | 12/1997 | Kashiwazaki et al. | 523/161 |
| 5,698,478 A | 12/1997 | Yamamoto et al. | 442/153 |
| 5,700,314 A | 12/1997 | Kurbayashi et al. | 106/31.27 |
| 5,734,403 A | 3/1998 | Suga et al. | 347/101 |
| 5,746,818 A | 5/1998 | Yatake | 106/31.86 |
| 5,764,261 A | 6/1998 | Koike et al. | 347/100 |
| 5,781,216 A | 7/1998 | Haruta et al. | 347/106 |
| 5,782,967 A | 7/1998 | Shirota et al. | 106/31.58 |
| 5,792,249 A | 8/1998 | Shirota et al. | 106/31.27 |
| 5,835,116 A | 11/1998 | Sato et al. | 347/98 |
| 5,849,815 A | 12/1998 | Aoki et al. | 523/161 |
| 5,902,387 A | 5/1999 | Suzuki et al. | 106/22 R |
| 5,922,625 A | 7/1999 | Haruta et al. | 442/75 |
| 5,985,975 A | 11/1999 | Kurabayashi et al. | 524/462 |
| 6,004,389 A | 12/1999 | Yatake | 106/31.86 |
| 6,027,210 A | 2/2000 | Kurabayashi et al. | 347/100 |
| 6,036,307 A | 3/2000 | Hakamada et al. | 347/106 |
| 6,080,229 A | 6/2000 | Watanabe et al. | 106/31.43 |
| 6,084,006 A | 7/2000 | Kashiwazaki et al. | 523/160 |
| 6,114,020 A | 9/2000 | Misuda et al. | 428/212 |
| 6,139,939 A | 10/2000 | Haruta et al. | 428/195 |
| 6,162,510 A | 12/2000 | Kashiwazaki et al. | 427/511 |
| 6,203,604 B1 | 3/2001 | Kashiwazaki et al. | 106/31.5 |
| 6,214,963 B1 | 4/2001 | Noguchi et al. | 528/71 |
| 6,238,045 B1 | 5/2001 | Ono et al. | 347/96 |
| 6,248,482 B1 | 6/2001 | Kashiwazaki et al. | 430/7 |
| 6,322,209 B1 | 11/2001 | Sato et al. | 347/105 |
| 6,341,855 B1 | 1/2002 | Kurabayashi | 347/100 |
| 6,342,096 B1 | 1/2002 | Kurabayashi | 106/31.27 |
| 6,367,921 B1 | 4/2002 | Kurabayashi et al. | 347/101 |
| 6,391,440 B1 | 5/2002 | Yoshino et al. | 428/342 |
| 6,391,947 B1 | 5/2002 | Noguchi et al. | 524/84 |
| 6,394,597 B1 | 5/2002 | Koike et al. | 347/106 |
| 6,398,355 B1 | 6/2002 | Shirota et al. | 347/100 |
| 6,399,674 B1 | 6/2002 | Kashiwazaki et al. | 523/161 |
| 6,412,936 B1 | 7/2002 | Mafune et al. | 347/100 |
| 6,426,766 B1 | 7/2002 | Shirota et al. | 347/106 |
| 6,460,987 B1 | 10/2002 | Katsuragi et al. | 347/100 |
| 6,460,989 B1 | 10/2002 | Yano et al. | 347/101 |
| 6,471,757 B1 | 10/2002 | Koitabashi et al. | 106/31.28 |
| 6,474,803 B1 | 11/2002 | Shirota et al. | 347/100 |
| 6,517,199 B1 | 2/2003 | Tomioka et al. | 347/101 |
| 6,521,323 B1 | 2/2003 | Sakaki et al. | 428/195 |
| 6,536,890 B1 | 3/2003 | Kato et al. | 347/100 |
| 6,540,344 B2 | 4/2003 | Kashiwazaki et al. | 347/100 |
| 6,552,156 B2 | 4/2003 | Noguchi et al. | 528/71 |
| 6,619,791 B2 | 9/2003 | Tochihara et al. | 347/100 |
| 6,659,601 B2 | 12/2003 | Goto et al. | 347/100 |
| 6,670,000 B1 | 12/2003 | Misuda et al. | 428/32.1 |
| 6,676,254 B2 | 1/2004 | Nagashima et al. | 347/100 |
| 6,698,876 B2 | 3/2004 | Sato et al. | 347/100 |
| 6,719,420 B2 | 4/2004 | Tomioka et al. | 347/100 |
| 6,723,137 B1 | 4/2004 | Hakamada et al. | 8/549 |
| 6,729,718 B2 | 5/2004 | Goto et al. | 347/100 |
| 6,730,375 B2 | 5/2004 | Moriya et al. | 428/32.37 |
| 6,746,114 B2 | 6/2004 | Takahashi et al. | 347/100 |
| 6,780,901 B1 | 8/2004 | Endo et al. | 523/160 |
| 6,783,229 B1 | 8/2004 | Inamoto et al. | 347/105 |
| 6,790,878 B2 | 9/2004 | Kurabayashi | 523/160 |
| 6,794,427 B2 | 9/2004 | Kurabayashi et al. | 523/161 |
| 6,811,839 B2 | 11/2004 | Hiro et al. | 428/32.3 |
| 6,821,328 B2 | 11/2004 | Tomioka et al. | 106/31.33 |
| 6,860,593 B2 | 3/2005 | Kashiwazaki et al. | 347/100 |
| 6,874,881 B2 | 4/2005 | Shirota et al. | 347/100 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 6,966,944 B2 | 11/2005 | Shimomura et al. | 106/31.43 |
| 7,029,109 B2 | 4/2006 | Shirota et al. | 347/100 |
| 7,055,943 B2 | 6/2006 | Suzuki et al. | 347/100 |
| 2002/0070995 A1* | 6/2002 | Asaki et al. | 347/22 |
| 2004/0027404 A1 | 2/2004 | Nagashima et al. | 347/8 |
| 2004/0119800 A1* | 6/2004 | Takada et al. | 347/96 |
| 2004/0125185 A1* | 7/2004 | Takada et al. | 347/100 |
| 2004/0231554 A1 | 11/2004 | Udagawa et al. | 106/31.15 |
| 2005/0109952 A1 | 5/2005 | Udagawa et al. | 250/461.1 |
| 2005/0195243 A1 | 9/2005 | Nagashima et al. | 347/54 |
| 2005/0204955 A1 | 9/2005 | Nagashima et al. | 106/31.59 |
| 2005/0219341 A1 | 10/2005 | Nito et al. | 347/100 |
| 2005/0284332 A1 | 12/2005 | Shinjo et al. | 106/31.27 |
| 2005/0288384 A1 | 12/2005 | Kanke et al. | 522/6 |
| 2006/0000386 A1 | 1/2006 | Hakamada et al. | 106/31.13 |
| 2006/0004116 A1 | 1/2006 | Kishi et al. | 522/146 |
| 2006/0007288 A1 | 1/2006 | Takada et al. | 347/100 |
| 2006/0007289 A1 | 1/2006 | Nito et al. | 347/100 |
| 2006/0096498 A1 | 5/2006 | Tsujimura et al. | 106/31.6 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103703 A1 | 5/2006 | Nito et al. | 347/100 |
| 2006/0103704 A1 | 5/2006 | Hakamada et al. | 347/100 |

| | | | | | | |
|---|---|---|---|---|---|---|
| 2006/0125895 A1 | 6/2006 | Nito et al. ............. 347/100 | JP | 10-114140 | 5/1998 | |
| 2006/0192827 A1 | 8/2006 | Takada et al. ............. 347/100 | JP | H10-130550 | 5/1998 | |
| 2006/0196389 A1 | 9/2006 | Tsuji et al. ............. 106/31.43 | JP | 11-78212 | 3/1999 | |
| | | | JP | 2000-19826 | 1/2000 | |
| FOREIGN PATENT DOCUMENTS | | | JP | 2000-94825 | 4/2000 | |
| | | | JP | 2000-198267 | 7/2000 | |
| JP | H04-332775 | 11/1992 | JP | 2000-247013 | 9/2000 | |
| JP | H06-157955 | 6/1994 | JP | 2001-115069 | 4/2001 | |
| JP | H06-240189 | 8/1994 | JP | 2002-211106 | 7/2002 | |
| JP | H09-16539 | 1/1997 | JP | 2002-332438 | 11/2002 | |
| JP | H09-118850 | 5/1997 | JP | 2003226827 A * | 8/2003 | |
| JP | 9-165539 | 6/1997 | WO | WO 2004/065501 A1 | 8/2004 | |
| JP | H09-176538 | 7/1997 | | | | |
| JP | 10-95941 | 4/1998 | * cited by examiner | | | |

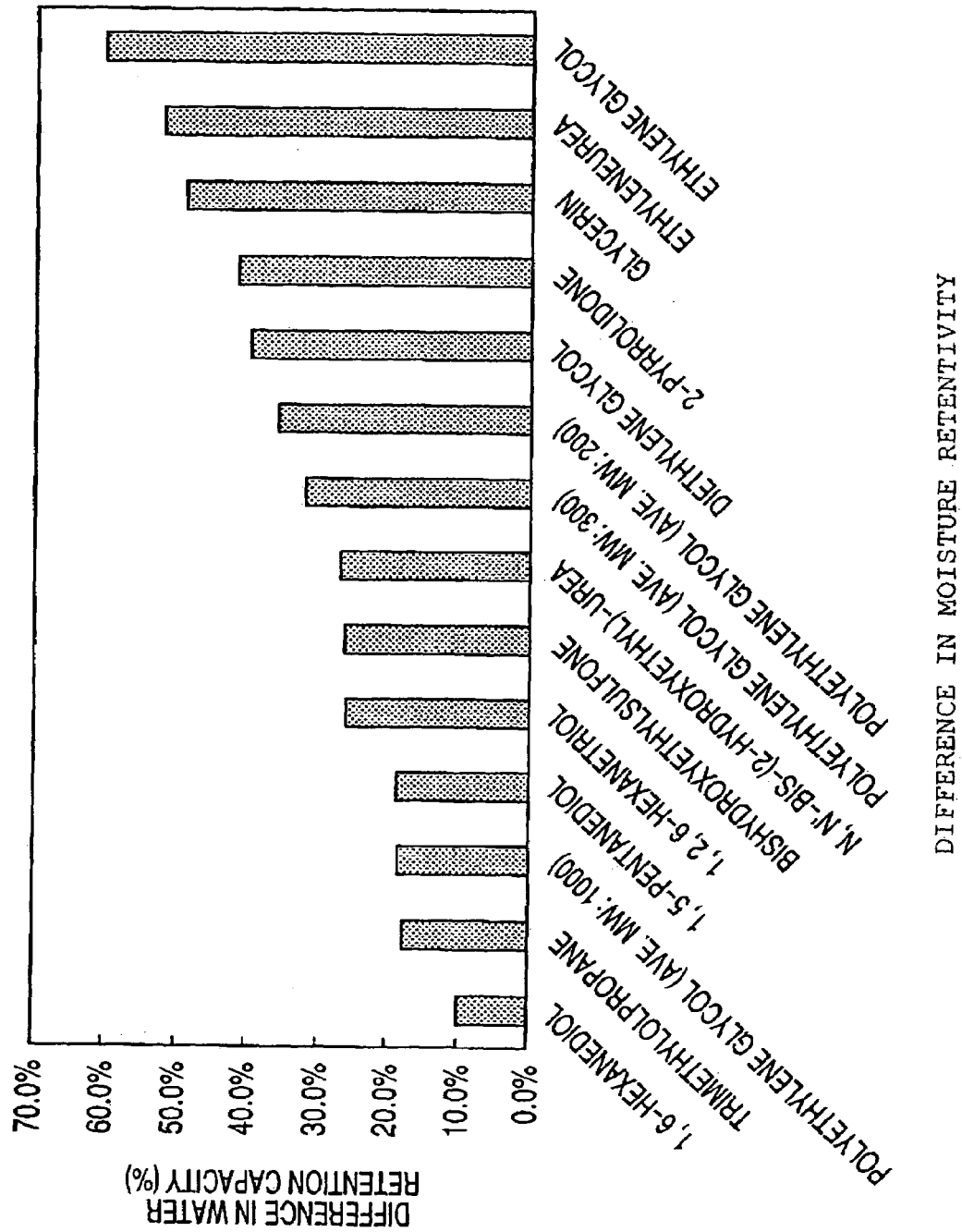

LIQUID COMPOSITION, SET OF LIQUID COMPOSITION AND INK, INK JET RECORDING APPARATUS, AND IMAGE FORMING METHOD

This application is a continuation of International Application No. PCT/JP2005/005293, filed Mar. 15, 2005, which claims the benefit of Japanese Patent Application Nos. 2004-075382, filed Mar. 16, 2004 and 2005-070016 filed Mar. 11, 2005.

BACKGROUND OF THE INVENTION

1. Field of the Invention

The present invention relates to a liquid composition, a set of a liquid composition and an ink, and an image recording method. In particular, the present invention relates to a liquid composition, a set of the liquid composition and an ink, an ink jet recording apparatus, and an image forming method in the case where the liquid composition and the ink are used in combination to conduct printing on a recording medium.

2. Related Background Art

Proposed as an ink jet recording method is a method including preparing a liquid for forming a good image separately of typical ink jet inks; and applying the liquid to a recording medium prior to ejection of a recording ink, to thereby form an image. For example, a method is disclosed, which involves applying a liquid having a basic polymer; and conducting recording with an ink containing an anionic dye (see, for example, Japanese Patent Application Laid-open No. S63-60783).

In the above method, the dye itself is precipitated on a recording medium in order to suppress bleeding of an image or to improve water resistance of the image. However, the method provides an insufficient suppressing effect on bleeding between color inks having different hues. In addition, the precipitated dye is apt to be unevenly distributed on recording paper, so uniformity of image quality may reduce. In particular, when plain paper is used as a recording medium, coating property with respect to pulp fibers is poor, so the tendency of a reduction in uniformity of image quality is remarkably observed.

On the other hand, an ink set is proposed as a system using a pigment as a colorant of ink, which is used by combining an ink containing a pigment dispersion and an ink containing a polyvalent metal for the purpose of alleviating bleeding in a multi-color printed product (see, for example, Japanese Patent Application Laid-open No. H09-118850). In this case, there is, for example, a constraint that a polyvalent metal whose compatibility with a colorant, that is, stability in ink is taken into consideration must be used for the ink containing a polyvalent metal. Accordingly, there arises a problem in that a sufficient image density is hardly obtained.

Proposed as a method of solving the above problem is a recording method (hereinafter, referred to as a two-liquid system) including applying a liquid composition containing a polyvalent metal to a recording medium; and conducting printing with an ink capable of reacting with the liquid composition to improve uniformity of an image and an image density. For example, an ink jet recording method is disclosed, which involves conducting printing with an ink jet recording liquid of an ink having a specific acid value, containing a water-soluble resin and a pigment dissolved into an aqueous medium in the presence of a basic compound, and having a specific surface tension on a recording paper obtained by applying a predetermined amount of a solution containing a dissociative polyvalent metal salt to plain paper (see, for example, Japanese Patent Application Laid-open No. 2000-94825).

Meanwhile, warping or curling of a recording medium, so-called curling phenomenon may occur when moisture is applied to the recording medium. Several methods have been conventionally proposed to alleviate and suppress the curling phenomenon. For example, an ink jet ink having 4 or more hydroxyl groups in its molecular structure and containing a solid substance that can be dissolved into water or an aqueous organic solvent is proposed (see, for example, Japanese Patent Application Laid-open No. H04-332775). In addition, an ink containing a saccharide, a sugar alcohol, or a specific amide compound is proposed as an anti-curling agent (see, for example, Japanese Patent Application Laid-open No. H06-157955, Japanese Patent Application Laid-open No. H06-240189, Japanese Patent Application Laid-open No. H09-165539, and Japanese Patent Application Laid-open No. H09-176538). In addition, an ink containing a combination of a specific polyhydric alcohol and glycerin is proposed (see, for example, Japanese Patent Application Laid-open No. H10-130550). In addition, an ink containing a solvent, a polymer binder, a dye mordant, a water-soluble anti-curling agent, a water-soluble desizing compound, a light-proof compound, an antifoaming agent, or the like is proposed (see, for example, Japanese Patent Application Laid-open No. 2000-198267).

SUMMARY OF THE INVENTION

The inventors of the present invention have made detailed studies for the purpose of obtaining an image having excellent suppressing effects on bleeding of an image and on bleeding between color inks having different hues using a two-liquid system.

There are various methods of applying a liquid composition for use in a two-liquid system to a recording medium. Examples of the methods include a method including the use of an ink jet method similarly for ink as well as, roller coating, bar coating, and spray coating. Furthermore, the following methods can be exemplified as methods of applying a liquid composition and ink to a recording medium.

(1) A method including applying a liquid composition to an entire surface of a recording medium.

(2) A method including selectively applying a liquid composition to only an image forming region to which an ink is applied and the vicinity of the image forming region.

(3) A method including applying a liquid composition and an ink to a recording medium in such a manner that the liquid composition and the ink are brought into contact with each other in liquid states on the recording medium.

(4) A method including applying an ink after a liquid composition has been fixed to a recording medium, that is, droplets of the liquid composition have been completely absorbed into the recording medium.

The inventors of the present invention have made extensive studies on those various application methods to conclude that a method including applying a liquid composition to an entire surface of a recording medium and applying an ink after the liquid composition is fixed to the recording medium is most excellent in image characteristics such as a reduction in density unevenness of an image to be obtained and fixability of the image.

However, the inventors have also found that the use of the above method causes a new problem. That is, the inventors have found that a phenomenon in which a recording medium warps or curls (curling phenomenon) occurs more remarkably than in other methods because a liquid composition is applied to an entire surface of the recording medium. In particular, in a system in which after a liquid composition is applied to a recording medium, the recording medium is conveyed in a recording apparatus and then an ink is applied to the recording medium, the recording medium to which the liquid composition is applied curls during conveyance till the time point at which the ink is applied to the recording medium, so insufficient conveyance may occur. In view of the above, the inventors have recognized that the importance of suppression of curling phenomenon is greater than that in the conventional case.

Therefore, an object of the present invention is to provide a liquid composition capable of alleviating and suppressing curling phenomenon while securing ejection stability after a head has been left standing required in a conventional liquid composition and ejection stability (start-up property) such as prevention of the occurrence of the disturbance, blurring, or the like of a printing of initial portion at the start of printing; a set of the liquid composition and an ink; an ink jet recording apparatus using the set of the liquid composition and the ink; and an image forming method.

The above object is achieved by the present invention described below. That is, according to one aspect of the present invention, there is provided a liquid composition for use in an image recording method comprising the steps of: applying an ink containing a colorant in a dissolved state or a dispersed state to a recording medium; and applying to the recording medium, a liquid composition which destabilizes the dissolved state or the dispersed state of the colorant in the ink by coming into contact with the ink, the liquid composition including at least a polyvalent metal ion, water, a water-soluble organic compound 1, and a water-soluble organic compound 2, in which a content X (mass %) of the water-soluble organic compound 1 is 15 mass % or more with respect to a total amount of the liquid composition; and the content X (mass %) of the water-soluble organic compound 1 with respect to the total amount of the liquid composition and a content Y (mass %) of the water-soluble organic compound 2 with respect to the total amount of the liquid composition satisfy the following relationship:

$$0 < Y/X \leq 0.9$$

Water-soluble organic compound 1: a water-retentive, water-soluble organic compound having a difference between a water retention ability in an environment of a temperature of 23° C. and a humidity of 45% and a water retention ability in an environment of a temperature of 30° C. and a humidity of 80% is 36% or less.

Water-soluble organic compound 2: a water-retentive, water-soluble organic compound other than the colorant and the water-soluble organic compound 1.

According to another aspect of the present invention, there is provided a set of a liquid composition and an ink, including the above liquid composition and the ink.

In further aspect of the set of the liquid composition and the ink, the liquid composition and the ink satisfy the following condition to suppress curling phenomenon of a recorded product produced with improved effectiveness.

Taking as (A) an absorbance at a maximum absorption wavelength in a visible region (at a wavelength of 550 nm when carbon black is used as a pigment) after a mixture of 50 g of a 800-times diluted aqueous solution of the liquid composition and 0.3 g of a 5-times diluted aqueous solution of the ink has been filtered through a filter having a pore size of 0.2 μm 15 minutes after preparation of the mixture and as (B) an absorbance at a maximum absorption wavelength in the visible region of a mixed solution of 0.3 g of a 5-times diluted aqueous solution of the aqueous ink and 50 g of pure water, (A) and (B) satisfy the following relationship:

$$(A)/(B) < 0.85$$

According to another aspect of the present invention, there is provided an ink jet recording apparatus including the above liquid composition and ink.

According to another aspect of the present invention, there is provided an image forming method including the steps of: applying an ink containing a colorant in a dissolved state or a dispersed state to a recording medium; and applying to the recording medium a liquid composition which destabilizes the dissolved state or the dispersed state of the colorant in the ink by coming into contact with the ink, in which the liquid composition includes at least a polyvalent metal ion, water, a water-soluble organic compound 1, and a water-soluble organic compound 2, a content X (mass %) of the water-soluble organic compound 1 is 15 mass % or more with respect to a total amount of the liquid composition; and the content X (mass %) of the water-soluble organic compound 1 with respect to the total amount of the liquid composition and a content Y (mass %) of the water-soluble organic compound 2 with respect to the total amount of the liquid composition satisfy the following relationship:

$$0 < Y/X \leq 0.9$$

Water-soluble organic compound 1: a water-retentive, water-soluble organic compound having a difference between a water retention ability in an environment of a temperature of 23° C. and a humidity of 45% and a water retention ability in an environment of a temperature of 30° C. and a humidity of 80% is 36% or less.

Water-soluble organic compound 2: a water-soluble organic compound other than the colorant and the water-soluble organic compound 1.

When the liquid composition of the present invention is used as a liquid composition to be applied to a two-liquid system, it becomes possible to alleviate and suppress curling phenomenon of a recording medium to which the liquid composition is applied while securing ejection stability after a head has been left standing and ejection stability (start-up property) such as prevention of the occurrence of the disturbance or blurring of a printing of initial portion at the start of printing. Therefore, even when the liquid composition is used in a system in which after the liquid composition is applied to a recording medium, the recording medium is conveyed in a recording apparatus and then ink is applied to the recording medium, it becomes possible to eliminate insufficient conveyance due to curling phenomenon of the recording medium. Furthermore, a curling phenomenon of an image obtained by applying ink to a recording medium to which a liquid composition is applied can be suppressed with improved effectiveness.

BRIEF DESCRIPTION OF THE DRAWINGS

FIG. 8 is a graph showing a difference in water retention abilities between water-soluble organic compounds.

DESCRIPTION OF THE PREFERRED EMBODIMENTS

Hereinafter, the present invention will be described in more detail by way of preferred embodiments.

[Water-Retentive, Water-Soluble Organic Compound]

Curling phenomenon after a liquid medium containing water has been applied to a recording medium is probably correlated with the evaporation of moisture applied to the recording medium to some degree. In view of the above, the inventors of the present invention have made the following detailed investigation on the water retention ability of a water-soluble organic compound typically used in ink jet inks or in an application solution in many cases.

First, 20 mass % aqueous solutions of various water-soluble organic compounds were prepared. 10 g of each of the solutions were weighed and placed in a glass dish, and the dish were left standing in an environment of a temperature of 23° C. and a humidity of 45%. Pure water containing no water-soluble organic compound was simultaneously left standing in the same manner. As the moisture evaporated, the solution amount in the dish reduced, and then the mass became constant. In the dish containing only pure water simultaneously left standing, pure water completely evaporated at this time. Therefore, it was assumed that the water-soluble organic compounds and the moisture held by the compounds remained in a dish containing the water-soluble compounds. In view of the above, the water retention ability of each compound was calculated from the following equation.

$$\text{Water retention ability \%} = \frac{(\text{Mass of remaining substance (g)}) - (\text{Mass of water-soluble compound (g)})}{(\text{Mass of water-soluble compound (g)})}$$

Figure 7:
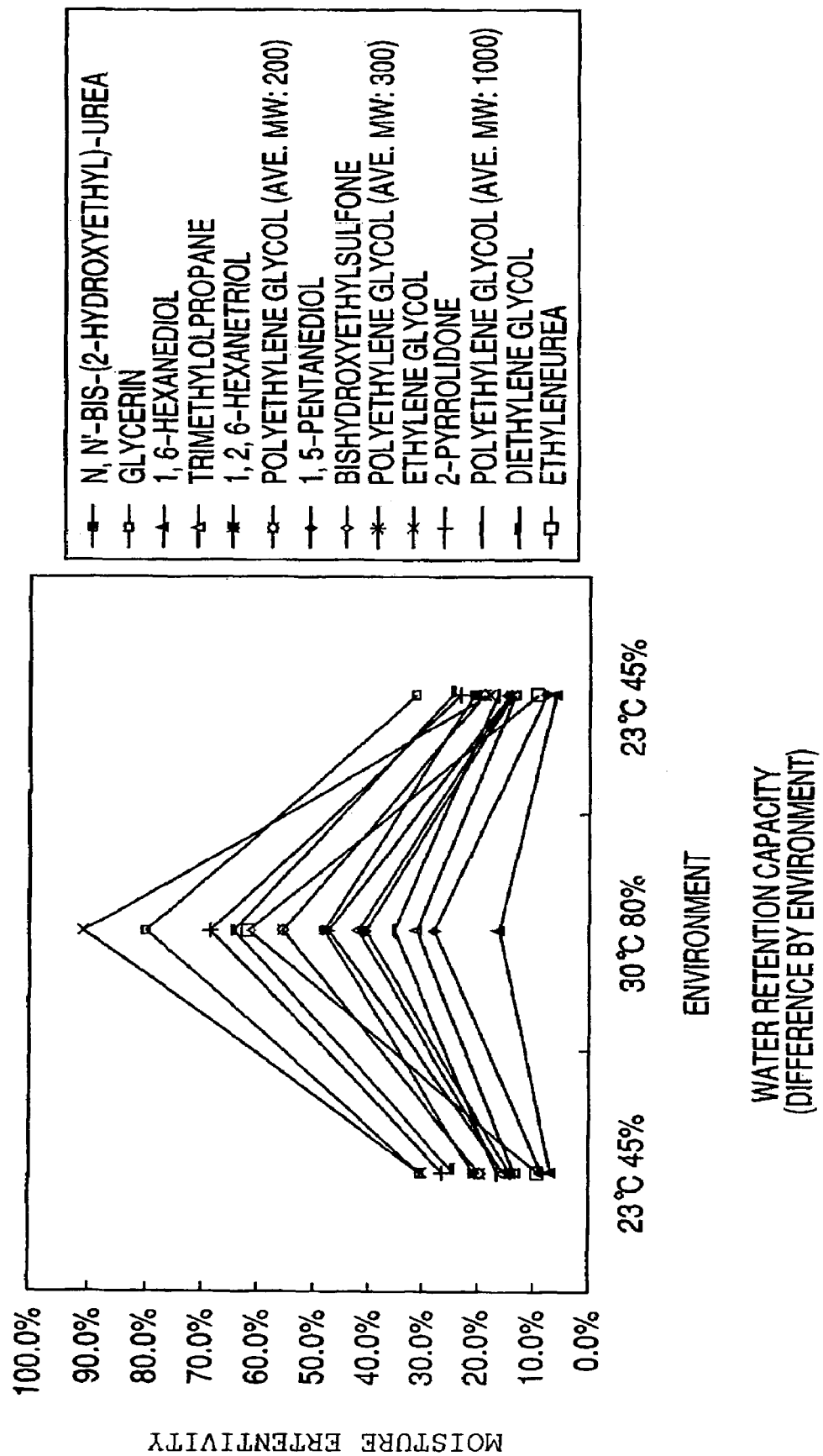
FIG. 7 is a graph showing measurements (difference due to an environment) of water retention abilities of water-soluble organic compounds.

Next, the above dish was moved to an environment of a temperature of 30° C. and a humidity of 80%. After the contents had reached equilibrium, the remaining weight under this environment was measured, and the water retention ability was determined in accordance with the above equation. Furthermore, the identical dish was moved to an environment of a temperature of 23° C. and a humidity of 45% again. Then, the remaining weight was measured and the water retention ability was determined in the same manner. FIG. 7 shows the results. Furthermore, FIG. 8 shows a difference in water retention ability between both the environments.

The inventors of the present invention have considered that the difference in water retention ability between both the environments and the occurrence of curling phenomenon of plain paper correlate with each other. In view of the above, the inventors have examined the occurrence of curling phenomenon by applying an aqueous solution containing each of the water-soluble organic compounds investigated above to plain paper. As a result, the inventors have found that a water-soluble organic compound 1 having a difference, between a water retention ability in an environment of a temperature of 23° C. and a humidity of 45% and a water retention ability in an environment of a temperature of 30° C. and a humidity of 80%, of 36% or less remarkably suppresses curling phenomenon. Then, the occurrence of curling phenomenon was observed by preparing an ink containing only a colorant, an additive, and those water-soluble organic compounds 1. As a result, the inventors have confirmed that no curling phenomenon occurs even after a recording medium has been left standing for several days at room temperature after printing.

However, in the case where a liquid composition composed only of the water-soluble organic compound 1 was placed into an ink jet recording apparatus and left standing for a long period of time in a state of being placed into an ink jet recording head for ejecting a droplet through a nozzle port, a new problem such as deterioration of ejection stability due to, for example, clogging of a nozzle and disturbance of a writing start part at the start of printing under a low temperature and low humidity environment occurred.

In view of the above, the inventors have made further investigation for the purpose of securing ejection stability at the same level as that of the conventional liquid composition while suppressing a certain degree or more of curling phenomenon. As a result, the inventors have found that the above problem can be solved by incorporating, into the liquid composition, a polyvalent metal and a water-soluble organic compound other than the water-soluble organic compound 1, more specifically a water-soluble organic compound 2 having a difference, between a water retention ability in an environment having a temperature of 23° C. and a humidity of 45% and a water retention ability in an environment having a temperature of 30° C. and a humidity of 80%, of more than 36% at a ratio satisfying the following condition in addition to the water-soluble organic compound 1.

$$0 < Y/X \leq 0.9$$

(X: content (mass %) of the water-soluble organic compound 1 with respect to the total amount of the liquid composition, Y: content (mass %) of the water-soluble organic compound 2 with respect to the total amount of the liquid composition)

Furthermore, the investigation by the inventors have revealed that, in addition to the above condition, the content X (mass %) of the water-soluble organic compound 1 needs to be 15 mass % or more with respect to the total amount of the liquid composition in order to suppress the curling phenomenon of a recording medium to which the liquid composition is applied with improved effectiveness.

The reason why the content X (mass %) of the water-soluble organic compound 1 with respect to the total amount of the liquid composition is set to be 15 mass % or more in the present invention is as follows. Even if the content of the water-soluble organic compound 1 is 15 mass % or less with respect to the total amount of the liquid composition, curling phenomenon can be suppressed to some degree when an amount of the liquid composition applied to a recording medium is excessively large. However, a liquid composition to be used in a two-liquid system is requested to be applied to a recording medium in as small an amount as possible when, for example, fixability of a printed portion after application of ink is taken into consideration. Therefore, when an amount of the liquid composition applied to a recording medium is small, more specifically the amount is 3.0 g/m$^2$ or less, the content X (mass %) of the water-soluble organic compound 1 with respect to the total amount of the liquid composition needs to be at least 15 mass % or more in order to suppress the curling phenomenon.

In addition, the total content X+Y (mass %) of the water-soluble organic compound 1 and the water-soluble organic compound 2 is preferably 30 mass % or more with respect to the total amount of the liquid composition. Furthermore, a water content is preferably 76 mass % or less with respect to the total amount of the liquid composition in terms of suppressing curling phenomenon, or is more preferably 71 mass % or less.

Furthermore, the content Y (mass %) of the water-soluble organic compound 2 with respect to the total amount of the liquid composition is preferably Y<15 mass %, and the water-soluble organic compound 1 is preferably selected from the group consisting of polyhydric alcohols and amide compounds. In particular, the water-soluble organic compound 1 is preferably a polyhydric alcohol having an amide bond, and preferably has a molecular weight Mw in the range of $100 \leqq Mw \leqq 1,000$.

The inventors of the present invention have made further investigation by using the water-soluble organic compounds 1 and 2. As a result, the inventors have found that curling phenomenon can be suppressed with improved efficiency by selectively using the water-soluble organic compound 1 depending on the amount of the liquid composition applied to a recording medium and the water content in the liquid composition. That is, in the case where the amount of the liquid composition applied to a recording medium is 10.0 g/m² or more and the content X (mass %) of the water-soluble organic compound 1 with respect to the total amount of the liquid composition is less than 25 mass %, or in the case where the amount of the liquid composition applied to the recording medium is 10.0 g/m² or more and the water content is more than 71 mass % with respect to the total amount of the liquid composition, the following water-soluble organic compound 1-1 capable of suppressing curling phenomenon of a printed product for a long period of time and the following water-soluble organic compound 1-2 that suppresses curling phenomenon occurring for a relatively short period of time immediately after printing are preferably incorporated into the liquid composition. In particular, in the above condition, a difference in curling phenomenon occurring for a relatively short period of time immediately after printing between a liquid composition containing the water-soluble organic compound 1-2 and a liquid composition not containing the compound is remarkable.

Water-Soluble Organic Compound 1-1:

(A) a polyhydric alcohol having at least three ether bonds, a polyhydric alcohol having at least three OH groups, or a polyhydric alcohol having at least one hydrophilic bonding group (bonding group having hydrogen bonding property) other than an OH group and an ether group; and (B) a water-soluble amide compound, each of (A) and (B) having a molecular weight Mw in the range of $100 \leqq Mw \leqq 1,000$.

Water-Soluble Organic Compound 1-2:

An alkanediol having a molecular weight Mw in the range of $100 \leqq Mw \leqq 150$ and OH groups on both terminals of its main chain.

The use of a liquid composition having the above structure as a liquid composition to be used in a two-liquid system has enabled the alleviation and suppression of curling phenomenon while securing ejection stability demanded for a liquid composition.

On the other hand, when a method of applying a liquid composition to a recording medium is not an ink jet recording method but a method of applying the liquid composition to the recording medium by means of roller coating, it is difficult to suppress the evaporation of moisture in the liquid composition on, for example, the surface of an application roller, so there arises a new problem in that a solid constituent in the liquid composition is separated out on, for example, the surface of the roller to affect an image. In view of the above, the inventors have concluded that a compound in which at least one of the water-soluble organic compound 1 and the water-soluble organic compound 2 is in a liquid state in an environment of a temperature of 25° C. and a humidity of 40% is preferably used for suppressing curling phenomenon even when a liquid composition is applied to a recording medium by means of roller coating while preventing the new problem, that is, the precipitation of a solid constituent on, for example, the surface of a roller. At least one of the water-soluble organic compound 1 and the water-soluble organic compound 2 is prepared to be a liquid compound at room temperature (25° C.), whereby ejection stability after a head has been left standing is improved.

[Liquid Composition]

The constituents constituting the liquid composition according to the present invention, the physical properties of the liquid composition, a method of applying the liquid composition to a recording medium, and an amount of the liquid composition applied to the recording medium will be described in detail.

(Water-Retentive, Water-Soluble Organic Compound)

Water-Soluble Organic Compound 1

The water-soluble organic compound 1 in the present invention is a water-retentive, water-soluble organic compound having a difference between a water retention ability in an environment of a temperature of 23° C. and a humidity of 45% and a water retention ability in an environment of a temperature of 30° C. and a humidity of 80% is 36% or less. Furthermore, the water-soluble organic compound 1 can be classified into the water-soluble organic compound 1-1 and the water-soluble organic compound 1-2 in terms of suppressing curling phenomenon. More specifically, the following compounds can be exemplified. The term "water-retentive, water-soluble organic compound" in the present invention refers to a water-soluble organic compound having a water retention ability of 5% or more in an environment of a temperature of 23° C. and a humidity of 45% according to the definition of the water retention ability described above.

Water-Soluble Organic Compound 1-1

Polyethylene glycol having an average molecular weight of 200 (mainly composed of tetraethylene glycol), 300 (mainly composed of hexaethylene glycol), 400 (mainly composed of nonaethylene glycol), 600 (mainly composed of tridecaethylene glycol), or 1,000 (mainly composed of docosaethylene glycol); a polyhydric alcohol compound which is trihydric or more such as 1,2,6-hexanetriol, trimethylol propane, trimethylol ethane, pentaerythritol, or diglycerin; and a polyhydric alcohol compound having a group having hydrogen bonding property (such as a carbonyl group, a sulfone group, or an amide group) such as glucose, sorbitol, bishydroxyethyl sulfone, N,N-bis-(2-hydroxyethyl)-urea, or tetra-(2-hydroxyethyl)-phenyldiamide. Of those, polyethylene glycol having an average molecular weight of 200 (mainly composed of tetraethylene glycol), 300 (mainly composed of hexaethylene glycol), 400 (mainly composed of nonaethylene glycol), 600 (mainly composed of tridecaethylene glycol), or 1,000 (mainly composed of docosaethylene glycol), 1,2,6-hexanetriol, trimethylol propane, bishydroxyethyl sulfone, and N,N-bis-(2-hydroxyethyl)-urea are preferable. Furthermore, N,N-bis-(2-hydroxyethyl)-urea is particularly preferable.

Water-Soluble Organic Compound 1-2

An alkanediol having OH groups on both terminals of its carbon main chain which may have a substituent such as 1,5-pentanediol, 1,6-hexanediol, 1,7-heptanediol, 3-methyl-1,5-pentanediol, 2-amino-2-methyl-1,3-propanediol, or 2-amino-2-ethyl-1,3-propanediol. Of those, 1,5-pentanediol and 1,6-hexanediol are particularly preferable.

Water-Soluble Organic Compound 2

The water-soluble organic compound 2 in the present invention is and a water-soluble organic compound other than a colorant and the water-soluble organic compound 1, that is, a water-soluble organic compound which has a difference between a water retention ability in an environment having a temperature of 23° C. and a humidity of 45% and a water retention ability in an environment having a temperature of 30° C. and a humidity of 80%, of more than 36%, and which does not satisfy the definition of the water-soluble organic compound 1. A water-soluble colorant or the like is not included in the category of the water-soluble organic compound 2. Specific examples of the water-soluble organic compound 2 include an alkylene glycol in which an alkylene group has 2 to 6 carbon atoms such as ethylene glycol, propylene glycol, diethylene glycol, triethylene glycol, or hexylene glycol; glycerin; 2-pyrrolidone; and a water-soluble compound having a hydrophilic group having a small number of carbon atoms such as urea or ethylene urea. Of those, diethylene glycol, glycerin, 2-pyrrolidone, urea, and ethylene urea are particularly preferable.

A compound such as urea or ethylene urea is preferable because it has a small molecular weight and hardly increases its viscosity even when an addition amount is increased. A compound such as urea or ethylene urea can be used in combination with a compound showing water solubility such as a water-soluble organic solvent or a dye to serve as a water-retentive, water-soluble compound in the present invention. The measurement of the water retention ability (difference due to an environment) of ethylene urea shown in FIG. 7 is data obtained by performing measurement using a dye in combination.

In the present invention, at least one of the water-soluble organic compound 1 and the water-soluble organic compound 2 to be used in combination is preferably in a liquid state at room temperature (25° C.). This is for preventing adherence between ink jet heads or between rollers due to the evaporation of the liquid composition of the present invention when means using an ink jet method or means for transferring using multiple rollers is used as means for applying the liquid composition to a recording medium.

(Polyvalent Metal Ion and a Salt Thereof)

Examples of a preferable polyvalent metal ion that can be used in the liquid composition according to the present invention include divalent metal ions such as $Ca^{2+}$, $Cu^{2+}$, $Ni^{2+}$, $Mg^{2+}$, $Zn^{2+}$, $Sr^{2+}$, and $Ba^{2+}$; and trivalent metal ions such as $Al^{3+}$, $Fe^{3+}$, $Cr^{3+}$, and $Y^{3+}$. However, the present invention is not limited to those examples. A salt of a polyvalent metal is used for incorporating those polyvalent metal ions into the liquid composition. The term "salt" refers to a metal salt composed of any one of such polyvalent metal ions as those described above and an anion that can bind to the ion. The salt is required to be soluble in water. A preferable anion for forming a salt is, for example, a conjugate base of a strong acid in terms of solubility. Preferable examples of the conjugate base include $NO_3^-$, $SO_4^{2-}$, and $Cl^-$ which are conjugate bases of nitric acid, sulfuric acid, and hydrochloric acid as strong acids. Of those, $NO_3^-$ is particularly preferable because of its excellent solubility in water.

In addition, it has been found that a strong acid salt containing a metal ion having a high ability to destabilize the constituents in ink out of those ions tends to cause a reduction in pH. The inventors have made investigation on nitrates of the polyvalent metal ions using a 4 mass % aqueous solution of a carbon black dispersing element (dispersant: styrene-acrylic acid, acid value 200, mass % of dispersant/mass % of pigment=0.2). As a result, the order of the ability to destabilize was $Fe^{3+}, Y^{3+}$, and $Al^{3+} > Cu^{2+}$ and $Ca^{2+} > Mg^{2+}$ and $Sr^{2+}$. The ions were ranked in this order in terms of the ease with which pH reduced as well. When salts composed of those polyvalent metal ions and strong acids are used, the metal ions are preferably added to the liquid composition in terms of reactivity with ink in such a manner that the metal ion concentration of a total of $Fe^{3+}$, $Al^{3+}$, and $Y^{3+}$ is 0.2 mass % or more, the metal ion concentration of a total of $Ca^{2+}$ and $Cu^{2+}$ is 0.5 mass % or more, and the metal ion concentration of a total of $Mg^{2+}$ and $Sr^{2+}$ is 1.0 mass % or more.

It is also confirmed that a reduction in pH of the liquid composition with time tends to occur when one tries to obtain a capacity in a salt of $Mg^{2+}$ and $Sr^{2+}$ having a relatively low ability to destabilize ink comparable to that of a salt of $Fe^{3+}$, $Al^{3+}$, and $Y^{3+}$ having a higher ability.

In the present invention, in terms of reactivity, coloring property, ease of handling, and the like, the polyvalent metal ion is preferably any one of $Ca^{2+}$, $Mg^{2+}$, $Sr^{2+}$, $Al^{3+}$, and $Y^{3+}$, and is more preferably $Ca^{2+}$.

The content of the polyvalent metal ion in the liquid composition is preferably 0.01 mass % or more and 10 mass % or less with respect to the total amount of the liquid composition. The content is more preferably 1.0 mass % or more and 5 mass % or less. To sufficiently exert a function of destabilizing ink to obtain high levels of image uniformity and optical density, the content of the polyvalent metal ion is preferably 2.0 mass % or more and 4.0 mass % or less with respect to the liquid composition. The content of the polyvalent metal ion in the liquid composition may exceed 10 mass %. However, there is no need to incorporate an excess amount of polyvalent metal ion into the liquid composition because, for example, even when the content exceeds 10 mass %, a significant increase in function of destabilizing ink cannot be expected.

(Factor of Change Due to Storage)

It has been found that when a polyvalent metal ion is incorporated into a liquid composition, the liquid composition may change owing to storage to make it impossible to obtain a high optical density, or the initial image quality and the image quality after a lapse of time may be different. The reason why such a phenomenon occurs is probably as follows.

An acid group such as a carboxyl group produced by oxidation of an organic compound in the liquid composition reacts with the polyvalent metal ion. As a result, a counter ion of the polyvalent metal ion (polyvalent metal anion) and a proton of the acid group produce an acid, so the pH of the liquid composition reduces. When the pH of the liquid composition fluctuates, the reactivity of the liquid composition changes, so image quality to be obtained also changes. For example, when the reactivity of the liquid composition reduces, a colorant penetrates a recording medium, so a high optical density cannot be obtained, or the colorant reaches the vicinity of the backside of the recording medium (so-called a strike-through phenomenon of the colorant).

In view of the above, the inventors of the present invention have concluded that when a polyvalent metal ion is incorporated into a liquid composition, a conjugate base of a strong acid and a conjugate base of a weak acid which causes a buffering action on a change in hydrogen ion concentration are preferably incorporated together to provide the liquid composition with a buffering action, thereby minimizing such a reduction in pH as described above. The pH in the present invention is a value measured at 25° C. in accordance with an ordinary method.

The liquid composition of the present invention preferably has a pH of 2 or more. A pH of less than 2 is not preferable because the constituents in the liquid composition erode the surface of a member such as a tank or a roller, and hence a constituent in the member is eluted in the liquid composition to adversely affect an image in some cases. The pH of the liquid composition is preferably in the range of 2 or more and 7 or less, or more preferably in the range of 3 or more and 6 or less. When the pH is within such range, the polyvalent metal ion can be present in the liquid composition with improved stability. Accordingly, reactivity of the liquid composition can be sufficiently secured, and the following buffering action can be sufficiently obtained. Therefore, long-term storage stability of the liquid composition can be maintained.

(Buffering Action on Change in Hydrogen Ion Concentration)

The phrase "action of alleviating a change in hydrogen ion concentration" in the present invention refers to the condition that when 1.0 ml of a 0.1-N aqueous solution of nitric acid is added to 50 ml of a liquid composition, a difference between a hydrogen ion concentration before the addition of the aqueous solution of nitric acid and that after the addition is $1 \times 10^{-4}$ or less (hereinafter, referred to as the "buffering action"). A change in hydrogen ion concentration can be calculated from a change in pH (hereinafter, referred to as the "change in hydrogen ion concentration"). When an initial pH is "a" and a pH after the addition of an aqueous solution of nitric acid is "b", a hydrogen ion concentration is calculated from the following equation.

Change in hydrogen ion concentration (mol/L)= $(10^{-b})-(10^{-a})$

In the present invention, it is preferable to incorporate a buffer in the liquid composition to obtain the buffering action. Preferable specific examples of the buffer include: acetates such as sodium acetate, potassium acetate, and lithium acetate; hydrogen phosphates; hydrogen carbonates; and hydrogen salts of polycarboxylic acids such as sodium hydrogen phthalate and potassium hydrogen phthalate. Specific examples of the polycarboxylic acid include, in addition to phthalic acid, malonic acid, maleic acid, succinic acid, fumaric acid, itaconic acid, phthalic acid, isophthalic acid, terephthalic acid, adipic acid, sebacic acid, dimer acid, pyromellitic acid, and trimellitic acid. In addition to the above compounds, any one of conventionally known compounds capable of exerting a buffering action on pH can be used in the present invention as long as the addition of the compound can maintain the pH of the liquid composition in a preferable range. However, in the present invention, an acetate is particularly preferably used as a buffer because it exhibits a buffering action at a pH appropriate for the liquid composition to be used in combination with ink.

Furthermore, when a buffer is incorporated into ink to obtain a buffering action, a metal ion derived from the buffer contributes to destabilization of a colorant in the ink. As a result, in the case where the liquid composition is used, such a high optical density as that cannot be obtained by merely using a liquid composition having a polyvalent metal ion can be obtained. When the liquid composition according to the present invention is used for image formation, such functions as those described above caused by the liquid composition synergistically act to suppress curling phenomenon of a printed conduct with improved reliability. In addition, an image having an extremely high optical density can be obtained extremely stably even after a lapse of a certain period of time from the initial stage of the use of the liquid composition.

(Physical Properties)

The inventors of the present invention have found that the degree of curling phenomenon of a recorded product obtained by using a two-liquid system is alleviated more remarkably as a larger amount of colorant aggregate in a recording medium is present on a surface layer portion.

Conditions for causing the aggregate to slightly penetrate in a depth direction of the recording medium surface layer portion include control of reactivity between the liquid composition and the ink. Furthermore, it is important to allow an amount of polyvalent metal ion sufficient to aggregate the colorant to be present at a position at a depth of 30 μm or less from the surface layer of the recording medium. Of course, not only the amount of polyvalent metal ion in the liquid composition but also permeability of the liquid composition into the recording medium and the amount of the liquid composition applied to the recording medium contribute to a large extent to allow a large amount of polyvalent metal ion in the liquid composition to be present at a position at a depth of 30 μm or less from the surface layer of the recording medium.

The liquid composition receives an influence of a solvent, a surfactant, or the like at the same time when it contacts a recording medium, to thereby permeate along the fibers of the recording medium. Furthermore, the permeated liquid starts to evaporate simultaneously with the permeation, and part of the polyvalent metal that has lost its dissolving power is expected to start to precipitate. That is, the permeation of the liquid into the recording medium and the evaporation of the liquid are promoted by increasing the reactivity of the liquid composition in a small application amount. As a result, a large number of polyvalent metal ions can penetrate and remain at a certain position in a depth direction of the surface layer portion of the recording medium.

From the foregoing, the inventors have concluded that in securing more effective permeability of the liquid composition of the present invention containing a polyvalent metal ion into plain paper, the Ka value of the liquid composition determined by means of the Bristow method is preferably 1.3 mL·m$^{-2}$·msec$^{-1/2}$ or more and the application amount of the liquid composition is preferably 0.5 g m$^2$ or more and 5 g/m$^2$ or less, and the Ka value is more preferably 3.0 mL·m$^{-2}$·msec$^{-1/2}$ or more and the application amount is more preferably 2.0 g/m$^2$ or more and 3.0 g/m$^2$ or less.

(Other Constituents)

In order to provide the liquid composition with desired physical property values, a surfactant, an antifoaming agent, an antiseptic, a mildewproofing agent, and the like may be added to the liquid composition as long as the addition of these components provides expected effects thereof and the purpose and effect of the present invention are not impaired.

(Recording Method and Apparatus)

Examples of a method of applying the liquid composition to the recording medium include a method including the use of an ink jet recording method and a method including applying the liquid composition to the recording medium by means of a roller or the like.

[Ink]

Constituents constituting the ink according to the present invention and the like will be described in detail.

(Constituents)

The ink of the present invention can form a high-quality image when the ink is used in combination with the liquid composition. Such ink preferably has a colorant dispersed or dissolved into an aqueous medium by an ionic group.

(Colorant)

Examples of the colorant used in the ink of the present invention include pigments such as carbon black and an organic pigment. One kind of pigment may be used, or two or more kinds of pigments may be used in combination. Examples of an available form of the pigment include a pigment dispersed by a dispersant, a self-dispersing pigment, and a colored fine-particle/microcapsule. They will be described in detail below.

Carbon Black

Specific examples of carbon black include carbon black pigments such as furnace black, lamp black, acetylene black, and channel black. Examples of an available carbon black pigment include: Raven 7000, Raven 5750, Raven 5250, Raven 5000, Raven 3500, Raven 2000, Raven 1500, Raven 1250, Raven 1200, Raven 1190 ULTRA-II, Raven 1170, and Raven 1255 (which are manufactured by Columbia Corporation); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Valcan XC-72R (which are manufactured by Cabot Corporation); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (manufactured by Degussa Co.); No. 25, No. 33, No. 40, No. 47, No. 52, No. 900, No. 2300, MCF-88, MA 600, MA 7, MA 8, and MA 100 (manufactured by Mitsubishi Chemical Corporation). Of course, the present invention is not limited to those examples, and any conventionally known carbon black can also be used. A magnetic substance fine particle such as magnetite or ferrite, titanium black, or the like may also be used as a black pigment.

Organic Pigment

Specific examples of the organic pigment include, but not limited to: insoluble azo pigments such as toluidine red, toluidine maroon, Hansa yellow, benzidine yellow, and pyrazolone red; soluble azo pigments such as lithol red, helio bordeaux, pigment scarlet, and permanent red 2B; derivatives from vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyranthrone-based pigments such as pyranthrone red and pyranthrone orange; thioindigo-based pigments; condensed azo-based pigments; thioindigo-based pigments; flavanthrone yellow; acylamide yellow; quinophthalone yellow; nickel azo yellow; topper azomethine yellow; perynone orange; anthrone orange; dianthraquinone red; and dioxazine violet.

The following can be exemplified as an organic pigment denoted by a color index (C.I.) number. Of course, any conventionally known organic pigments other than those described below may also be used.

C.I. Pigment Yellow: 12, 13, 14, 17, 20, 24, 74, 83, 86, 93, 109, 110, 117, 120, 125, 128, 137, 138, 147, 148, 151, 153, 154, 166, and 168.

C.I. Pigment Orange: 16, 36, 43, 51, 55, 59, and 61.

C.I. Pigment Red: 9, 48, 49, 52, 53, 57, 97, 122, 123, 149, 168, 175, 176, 177, 180, 192, 215, 216, 217, 220, 223, 224, 226, 227, 228, 238, and 240.

C.I. Pigment Violet: 19, 23, 29, 30, 37, 40, and 50.

C.I. Pigment Blue: 15, 15:1, 15:3, 15:4, 15:6, 22, 60, and 64.

C.I. Pigment Green: 7 and 36.

C.I. Pigment Brown: 23, 25, and 26.

Dispersant

A dispersant is preferably used in combination if any one of the above carbon black and organic pigments is used. A dispersant capable of stably dispersing any one of the above pigments into an aqueous medium by virtue of an action of an anionic group is preferably used. Specific examples of the dispersant include a styrene-acrylic acid copolymer, a styrene-acrylic acid-alkyl acrylate copolymer, a styrene-maleic acid copolymer, a styrene-maleic acid-alkyl acrylate copolymer, a styrene-methacrylic acid copolymer, a styrene-methacrylic acid-alkyl acrylate copolymer, a styrene-maleate half ester copolymer, a vinyl naphthalene-acrylic acid copolymer, a vinyl naphthalene-maleic acid copolymer, a styrene-maleic anhydride-maleate half ester copolymer, and salts of these copolymers. In addition, any one of those dispersants has an average molecular weight in the range of preferably 1,000 to 30,000, or particularly preferably 3,000 to 15,000.

Self-Dispersing Pigment

A pigment that can be dispersed into an aqueous medium without any dispersant by providing an ionic group (anionic group) to bond to the pigment surface, that is, the so-called self-dispersing pigment can also be used as a colorant. An example of such a pigment includes self-dispersing carbon black. An example of the self-dispersing carbon black includes anionic carbon black in which an anionic group bonds to the carbon black surface.

Anionic Carbon Black

An example of the anionic carbon black includes carbon black the surface of which has at least one anionic group selected from —COOM, —SO$_3$M, —PO$_3$HM, and —PO$_3$M$_2$ bounding thereto. In the above formulae, M represents a hydrogen atom, an alkali metal, ammonium, or organic ammonium. Carbon black the surface of which has —COOM or —SO$_3$M out of the above groups bonding to the surface thereof and is charged to be anionic is particularly preferably used in the present invention because of its good dispersibility in ink.

Specific examples of the alkali metal out of those represented by "M" in the above hydrophilic groups include Li, Na, K, Rb, and Cs. In addition, specific examples of the organic ammonium include methylammonium, dimethylammonium, trimethylammonium, ethylammonium, diethylammonium, triethylammonium, methanolammonium, dimethanolammonium, and trimethanolammonium.

In addition, the ink of the present invention containing the self-dispersing carbon black in which M represents ammonium or organic ammonium can further improve the water resistance of a recorded image, so it can be used particularly preferably in this respect. This is probably due to an influence of the decomposition and evaporation of ammonium when the ink is applied onto a recording medium. Here, the self-dispersing carbon black in which M represents ammonium can be obtained by, for example, a method including substituting M, which represents an alkali metal, in self-dispersing carbon black by ammonium by means of an ion exchange method or a method including adding an acid to convert self-dispersing carbon black in which M represents an alkali metal to an H type and adding ammonium to convert M into ammonium.

An example of a method of producing anionic carbon black includes a method including subjecting carbon black to oxidation treatment with sodium hypochlorite. The method enables a —COONa group to bond to the carbon black surface.

Any one of the various hydrophilic groups described above may directly bond to the carbon black surface. Alternatively, any one of the hydrophilic groups may indirectly bond to the carbon black surface after another atomic group has been interposed between the carbon black surface and the hydrophilic group. Specific examples of the other atomic group include a linear or branched alkylene group having 1 to 12 carbon atoms; a substituted or unsubstituted phenylene group; and a substituted or unsubstituted naphthylene group. Examples of substituents for a phenylene group and a naphthylene group include a linear or branched alkyl group having 1 to 6 carbon atoms. Specific examples of a combination of the other atomic group and the hydrophilic group include —$C_2H_4COOM$, -Ph-$SO_3M$, and 60-Ph-COOM (where Ph represents a phenylene group).

In the present invention, two or more kinds of the above self-dispersing carbon black may be appropriately selected and used as colorants of ink. In addition, the amount of self-dispersing carbon black added to an ink is in the range of preferably 0.1 mass % or more and 15 mass % or less, or particularly preferably 1 mass % or more and 10 mass % or less with respect to the total amount of the ink. With this range, the self-dispersing carbon black can maintain a sufficient dispersed state in the ink. Furthermore, in addition to the self-dispersing carbon black, a dye may be added as a colorant for the purpose of adjusting the hue of the ink and for other purposes.

Colored Fine Particle/Microencapsulated Pigment

In addition to those described above, a pigment microencapsulated by using a polymer or the like, a colored fine particle obtained by coating the periphery of a resin particle with a colorant, or the like may also be used as a colorant. A microcapsule, which intrinsically has dispersibility into an aqueous medium, may be coexistent with any one of such dispersants as described above in an ink for improving dispersion stability. When a colored fine particle is used as a colorant, any one of the anionic dispersants described above or the like is preferably used.

(Aqueous Medium)

An aqueous medium into which a colorant is to be dispersed is not particularly limited as long as it can be used for ink. When an ink is applied to a recording medium by means of an ink jet method (such as a bubble jet method), the viscosity and surface tension of the ink are preferably adjusted to provide the ink with ink jet ejection property.

Examples of the aqueous medium used for the ink of the present invention include water and a mixed solvent of water and a water-soluble organic solvent. A water-soluble organic solvent having a preventing effect on drying of ink is particularly preferable. Specific examples of such a water-soluble organic solvent include: alkyl alcohols each having 1 to 4 carbon atoms such as methyl alcohol, ethyl alcohol, n-propyl alcohol, isopropyl alcohol, n-butyl alcohol, see-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; alkylene glycols each having 2 to 6 carbon atoms such as ethylene glycol, propylene glycol, butylene glycol, triethylene glycol, 1,2,6-hexanetriol, thiodiglycol, hexylene glycol, and diethylene glycol; lower alkyl ether acetates such as polyethylene glycol monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; polyhydric alcohols such as trimethylol propane and trimethylol ethane; N-methyl-2-pyrrolidone; 2-pyrrolidone; and 1,3-dimethyl-2-imidazolidinone. Each of the above water-soluble organic solvents may be used alone, or two or more of them may be used as a mixture. In addition, deionized water (ion-exchanged water) is preferably used as water.

The content of the water-soluble organic solvent in the ink of the present invention is not particularly limited, but is preferably in the range of 3 mass % or more and 50 mass % or less with respect to the total amount of the ink. In addition, the water content is in the range of 50 mass % or more and 95 mass % or less, preferably 82 mass % or less, further preferably 77 mass % or less, or particularly preferably 72 mass % or less with respect to the total amount of the ink.

An increased amount of the water-soluble organic compound having a difference between a water retention ability in an environment of a temperature of 23° C. and a humidity of 45% and a water retention ability in an environment of a temperature of 30° C. and a humidity of 80% of 36% or less, as in the liquid composition, is incorporated into ink, whereby curling phenomenon after the ink has been applied to a recording medium can be further alleviated.

(Other Constituents)

It needless to say that, in addition to the above constituents, a humectant is added as required to the ink according to the present invention. In order to provide the ink with desired physical property values, a surfactant, an antifoaming agent, an antiseptic, a mildewproofing agent, and the like may be added to the ink as long as the addition of these components provides an effect and the purpose and effect of the present invention are not impaired.

(Hue of Ink)

The hue of ink constituting a set of a liquid composition and the ink is not particularly limited, and it is sufficient to use an ink showing at least one hue selected from yellow, magenta, cyan, red, green, blue, and black. To be specific, any one of the colorants described above may be appropriately selected to prepare an ink having a desired hue. For example, when ink is used for ink jet recording, the content of a colorant in the ink has only to be appropriately selected to provide the ink with excellent ink jet ejection property and desired hue and concentration. The content is, for example, preferably in the range of 1 mass % to 50 mass % with respect to the total mass of the ink. In addition, the water content is preferably in the range of 50 mass % to 95 mass % with respect to the total mass of the ink.

The number of inks to be used in combination with the liquid composition is not limited to 1, and it is more preferable to use two or more inks having different hues to prepare an ink set suitable for forming a multi-color image. In this case, at least one ink of the two or more inks has only to react with the liquid composition.

If at least one of the inks constituting the ink set has a colorant dispersed into an aqueous medium by virtue of an action of an ionic group, each of the other inks may be an ink containing a dye as a colorant. It is needless to say that each of all inks has a colorant dispersed into an aqueous medium by virtue of an action of an ionic group. With such an ink set, bleeding which occurs when inks having different hues are applied onto a recording medium so as to be adjacent to each other, and becomes a problem when a multi-color image is formed by using an ink jet apparatus, can be suppressed.

More specifically, the bleeding which becomes a problem in an ink jet multi-color image is apt to be particularly remarkable between a black ink and another color ink (for example, at least one ink selected from a yellow ink, a magenta ink, a cyan ink, a red ink, a green ink, and a blue ink). Therefore, it is preferable to combine a black ink which is constituted by dispersing a colorant into an aqueous medium by virtue of an action of an ionic group so as to interact with the liquid composition. The other color ink may be an ink obtained by dissolving a dye into an aqueous medium or an ink obtained by dispersing a colorant into an aqueous medium by virtue of an action of an ionic group as in the black ink.

[Set of Liquid Composition and Ink]

The inventors of the present invention have made further investigation for the purpose of suppressing curling phenomenon of a recorded product produced by means of a two-liquid system for forming an image by using a liquid composition and an ink with improved effectiveness. As a result, they have found that the curling phenomenon of the recorded product to be obtained can be suppressed with improved effectiveness when the ink and the liquid composition to be applied to a recording medium satisfy the following condition.

Taking as (A) an absorbance at a maximum absorption wavelength in a visible region (at a wavelength of 550 nm when carbon black is used as a pigment) of a mixture of 50 g of a 800-times diluted aqueous solution of the liquid composition and 0.3 g of a 5-times diluted aqueous solution of the ink is filtered through a filter of 0.2 µm 15 minutes after preparation of the mixture and as (B) an absorbance at a maximum absorption wavelength in the visible region of a mixed solution of 0.3 g of a 5-times diluted aqueous solution of the ink and 50 g of pure water, (A) and (B) satisfy the following relationship:

$$(A)/(B)<0.85$$

The inventors of the present invention consider a mechanism by which the curling phenomenon of a recorded product obtained by using the liquid composition and the ink specified as described above can be suppressed with improved effectiveness to be the following. The above relational expression specifies a reaction capability between the liquid composition and the ink. When the reactivity is specified as described above, a large amount of aggregate produced by contact between the polyvalent metal ion in the liquid composition and the colorant in the ink is present on the surface layer portion of the recording medium. Accordingly, it can be assumed that the contraction of cellulose which occurs after the application of water content can be suppressed.

[Ink Jet Recording Apparatus]

Next, an example of a recording apparatus for forming an image by using the liquid composition and/or the ink will be shown.

Figure 1:
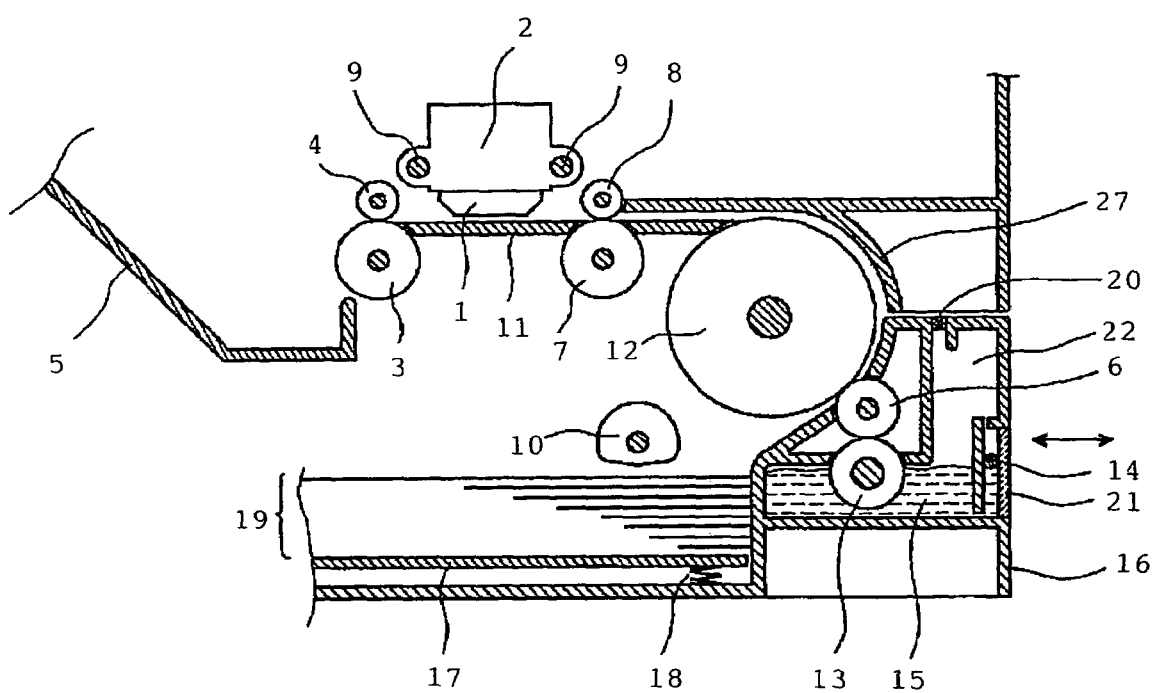
FIG. 1 is a schematic side sectional view showing an example of an ink jet recording apparatus.

FIG. 1 shows an example of an ink jet recording apparatus as a partial sectional view. The image forming apparatus uses a serial-type ink jet recording method, and includes a sheet feeding cassette 16 having a recording head 1, a sheet feeding tray 17 for feeding a recording medium (hereinafter, also referred to as recording paper) 19, and means for applying the liquid composition of the present invention integrally formed therein; driving means for reciprocating the recording head in a direction perpendicular to a conveyance direction of the recording paper; and controlling means for controlling the driving of these constituents.

The recording head 1 is mounted on a carriage 2 in such a manner that a surface on which an ink ejection port is formed is disposed to the side of a platen 11. Although not shown, the recording head 1 has the ink ejection port, multiple electro-thermal converting members (such as heating resistance elements) for heating an ink liquid, and a substrate for supporting them. The recording head 1 has an ink cartridge mounted in its upper carriage.

The carriage 2 has the recording head 1 mounted thereon, and can reciprocate along two guide shafts 9 extending in parallel with a width direction of the recording paper 19. In addition, the recording head 1 drives in synchronization with the reciprocating motion of the carriage, and ejects an ink droplet to the recording paper 19 to form an image. The sheet feeding cassette 16 can be detached from the main body of the image forming apparatus. The recording paper 19 is stacked and stored on the sheet feeding tray 17 in the sheet feeding cassette 16. At the time of sheet feeding, the uppermost sheet is pressed against a sheet feeding roller 10 by a spring 18 for pressing the sheet feeding tray 17 upward. The sheet feeding roller 10 is a roller having a substantially half-moon sectional shape, and is rotated by a motor (not shown) to feed only the uppermost sheet (the recording paper 19) by using a separation hook (not shown).

The recording paper 19 that has been separated and fed is conveyed along a conveyance surface of the sheet feeding cassette 16 and a conveyance surface of a paper guide 27 by an intermediate roller 12 having a large diameter and an application roller 6 having a small diameter and pressed against the intermediate roller 12. Those conveyance surfaces are composed of surfaces warped to draw arcs concentric with the intermediate roller 12. Therefore, the recording paper 19 passes through those conveyance surfaces to reverse its conveyance direction. That is, the surface of the recording paper 19 on which printing is conducted is directed downward until the paper is conveyed from the sheet feeding tray 17 to reach the intermediate roller 12, but is directed upward (to the side of the recording head) when the paper is opposed to the recording head 1. Therefore, the printing surface of the recording paper is always directed to the outside of the image forming apparatus.

Liquid composition applying means is arranged in the sheet feeding cassette 16, and includes a replenishment tank 22 for supplying a liquid composition 15, an supply roller 13 rotatably supported in a state where part of the peripheral surface of the roller is immersed in the tank 22, and the application roller 6 which is arranged to be parallel with the supply roller 13, and which comes into contact with the intermediate roller 12 and rotates in the same direction. In addition, the application roller 6 is arranged in such a manner that the peripheral surface of the application roller 6 comes into contact and is parallel with the intermediate roller 12 for conveying the recording paper 19. Therefore, when the recording paper 19 is conveyed, the application roller 6 rotates in association with the rotation of the intermediate roller 12. As a result, a supply roller 13 supplies the peripheral surface of the application roller 6 with the liquid composition 15, and the liquid composition is evenly applied by the application roller 6 to the printing surface of the recording paper 19 sandwiched between the application roller 6 and the application roller 12.

In addition, in the ink jet recording apparatus, a float 14 is arranged in the replenishment tank 22. The float 14 is a substance having a smaller specific gravity than that of the liquid composition 15, and floats on the liquid surface of the liquid composition. As a result, the remaining quantity of the liquid composition containing a reactive constituent can be observed with the eyes from the outside through a remaining quantity display window 21 of a transparent member.

Figure 2:
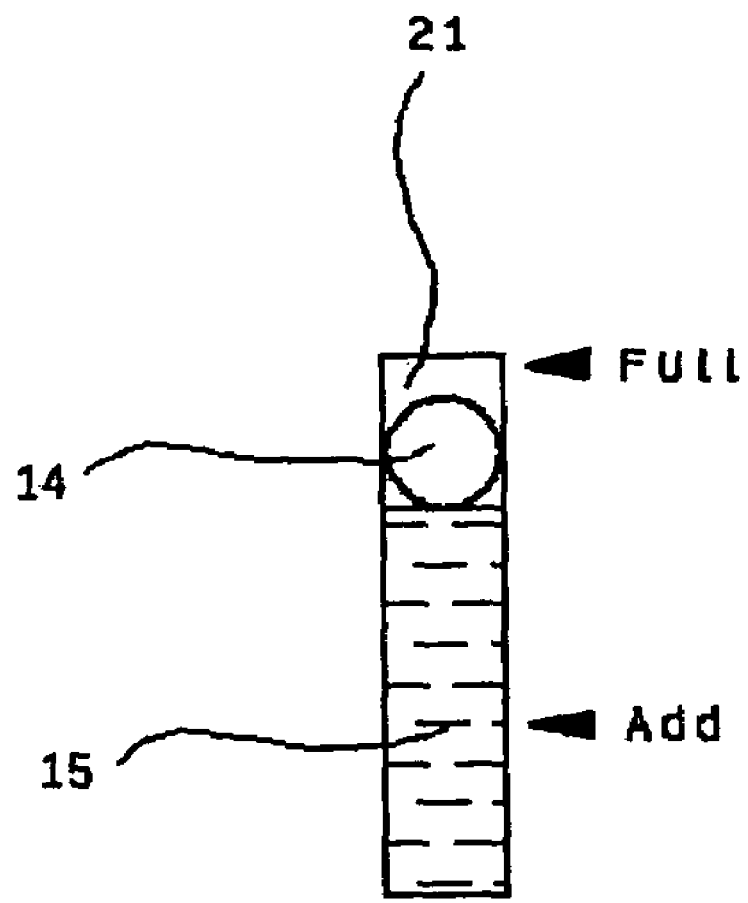
FIG. 2 is a front sectional view of a liquid composition remaining quantity display portion in the ink jet recording apparatus of FIG. 1.

FIG. 2 is a front view of a remaining quantity display portion. The remaining quantity display portion has indications displaying the degree of the remaining quantity along a longitudinal direction of the remaining quantity display window 21. In the figure, when the liquid surface of the liquid composition or the float 14 reaches a position indicated by "Full", the tank is filled with the liquid composition. On the other hand, when the liquid surface of the liquid composition or the float 14 is lowered to a position indicated by "Add", the remaining quantity of the liquid composition is small. Therefore, it can be clearly seen that the tank should be replenished with the liquid composition 15 when the quantity of the liquid composition decreases and the float 14 is lowered to the Add line.

Figure 3:
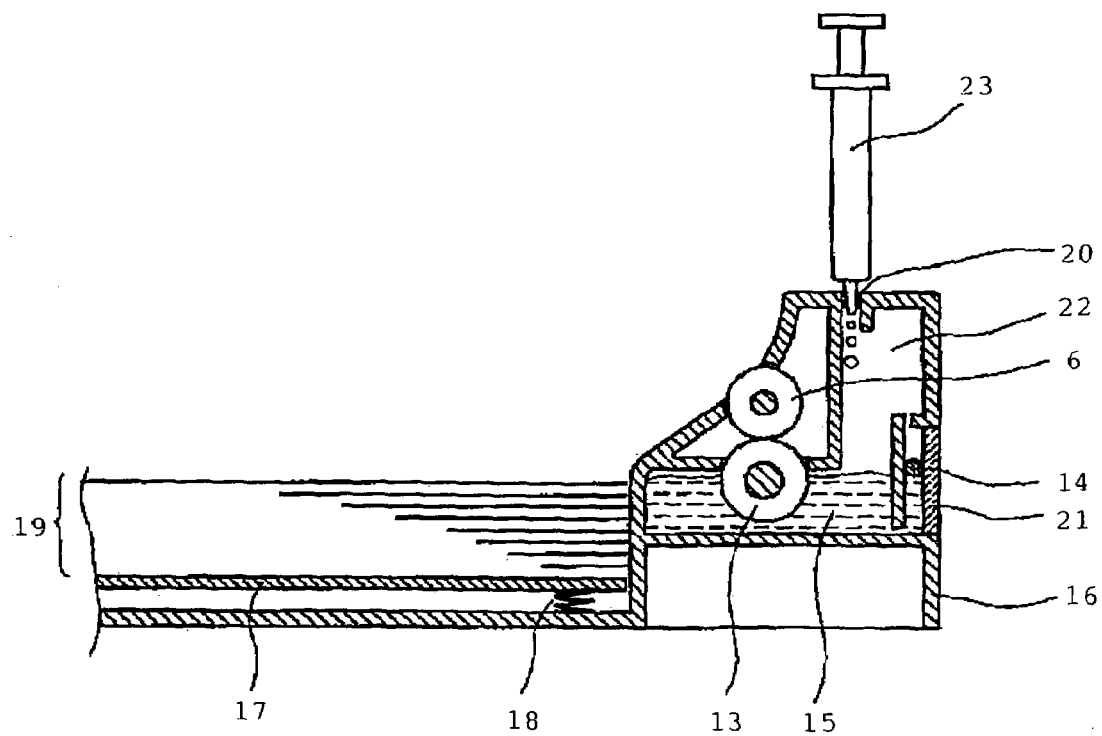
FIG. 3 is a schematic side sectional view showing how the ink jet recording apparatus of FIG. 1 is replenished with a liquid composition.

As shown in FIG. 3, the liquid composition is injected into the replenishment tank 22 by inserting a tip of an injection tool 23 into an injection port 20 constituted of a rubber member in a state where the sheet feeding cassette 16 is drawn out from the main body of the image forming apparatus.

Thus, a predetermined amount of the recording paper to which the liquid composition has been applied is conveyed to a recording portion by a main conveyance roller 7 and a pinch roller 8 pressing against the roller 7, and ink is applied from the recording head 1 to the paper. The recording sheet 19 which has been fed and subjected to printing by the above constitution is discharged and conveyed by a sheet discharge roller 3 and a spur 4 pressed against the roller 3, and is stacked on a sheet discharge tray 5.

In addition, when the liquid composition is applied by means of a roller or the like, the viscosity of the liquid composition is particularly preferably set to be higher than that of the ink because the ink can be destabilized with a small application amount effectively and fixability and the like of a recorded product become good. More specifically, the liquid composition easily reacts with the ink effectively when the viscosity of the liquid composition is high because the polyvalent metal ion is more likely to accumulate on an upper portion of the recording medium.

Meanwhile, it is preferable that after the reaction with the liquid composition, a colorant component in the ink accumulate on the upper portion of the recording medium, and a solvent, water, and the like quickly permeate into the recording medium. That is, it is preferable that solid-liquid separation be quickly performed. Therefore, the viscosity is preferably low in terms of fixability and the like of a recorded product. The viscosity of a liquid composition when the liquid composition is applied by means of a roller or the like is preferably 3 mPa·s or more and 100 mPa·s or less, or more preferably 5 mPa·s or more and 60 mPa·s or less. The viscosity of the liquid composition or of the ink in the present invention is a value measured at 25° C. in accordance with an ordinary method.

Figure 4:
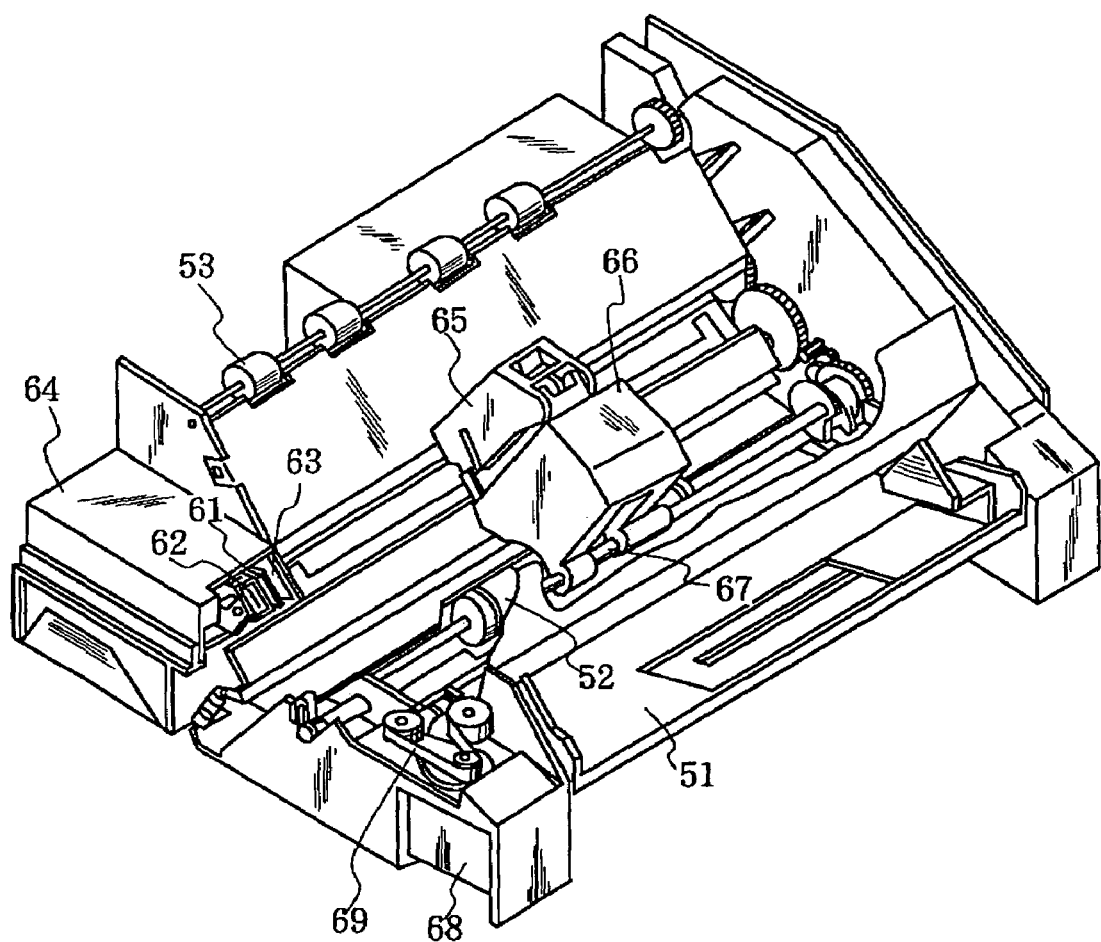
FIG. 4 is a schematic perspective view showing an example of an ink jet recording apparatus.

FIG. 4 shows another example of an ink jet recording apparatus. In FIG. 4, reference numeral 61 denotes a blade as a wiping member, one end of which is held by and fixed to a blade holding member to provide a cantilever form. The blade 61 is arranged at a position adjacent to a recording region provided by a recording head 65. In this example, the blade 61 is held while projecting in a movement path of the recording head 65.

Reference numeral 62 denotes a cap of a projection port surface of the recording head 65, the cap being arranged at a home position adjacent to the blade 61 and moving in a direction perpendicular to the movement direction of the recording head 65 to be pressed against an ink ejection port surface, thereby performing capping. Furthermore, reference numeral 63 denotes an ink absorber arranged to be adjacent to the blade 61. As in the blade 61, the ink absorber 63 is held while projecting in the movement path of the recording head 65. An ejection recovery portion 64 is constituted by the blade 61, the cap 62, and the ink absorber 63. The blade 61 and the ink absorber 63 remove moisture, dust, and the like from the ejection port surface. In addition, each ink of the recording head, and furthermore ink positioned at the ejection port of the liquid composition and the like are sucked by a pump (not shown) through the cap. Thus, a recovery unit for recovering the intrinsic ejection performance of ink intrinsic to the recording head, or of the ink and the liquid composition is constituted.

Reference numeral 65 denotes the recording head having ejection energy generating means, to eject ink to a recording medium opposed to an ejection port surface on which an ejection port is arranged to perform recording. Reference numeral 66 denotes a carriage to be mounted on the recording head 65 for moving the recording head 65. The carriage 66 is slidably engaged with a guide shaft 67, and part of the carriage 66 is connected (not shown) to a belt 69 driven by a motor 68. With this configuration, the carriage 66 can move along the guide shaft 67, and can move in a recording region provided by the recording head 65 and a region adjacent to the recording region. Reference numeral 51 denotes a sheet feeding portion for inserting a recording medium, and reference numeral 52 denotes a sheet feeding roller driven by a motor (not shown).

With those components, a recording medium is fed to a position opposed to the ejection port surface of the recording head 65, and is discharged to a sheet discharge portion having a sheet discharge roller 53 as a recording process proceeds. When the recording head 65 finishes recording to return to its home position in the above configuration, the cap 62 of the ejection recovery portion 64 evacuates from the movement path of the recording head 65, while the blade 61 projects into the movement path. As a result, the ejection port of the recording head 65 is wiped. When the cap 62 is brought into contact with the ejection port surface of the recording head 65 to perform capping, the cap 62 moves so as to project into the movement path of the recording head. When the recording head 65 moves from its home position to a recording start position, the cap 62 and the blade 61 are placed at the same positions as those at the time of the wiping. As a result, the ejection port surface of the recording head 65 is wiped even in this movement.

The recording head moves to its home position at the completion of the recording and at the time of ejection recovery. The recording head also moves to its home position adjacent to the recording region at a predetermined interval while the recording head moves in the recording region for performing recording. The wiping is performed in accordance with this movement.

Figure 5:
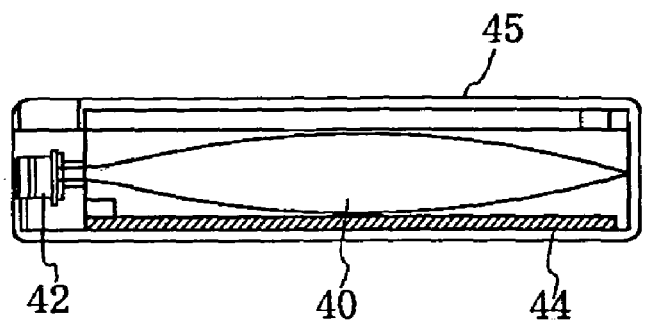
FIG. 5 is a vertical sectional view showing an example of an ink cartridge.
Figure 6:
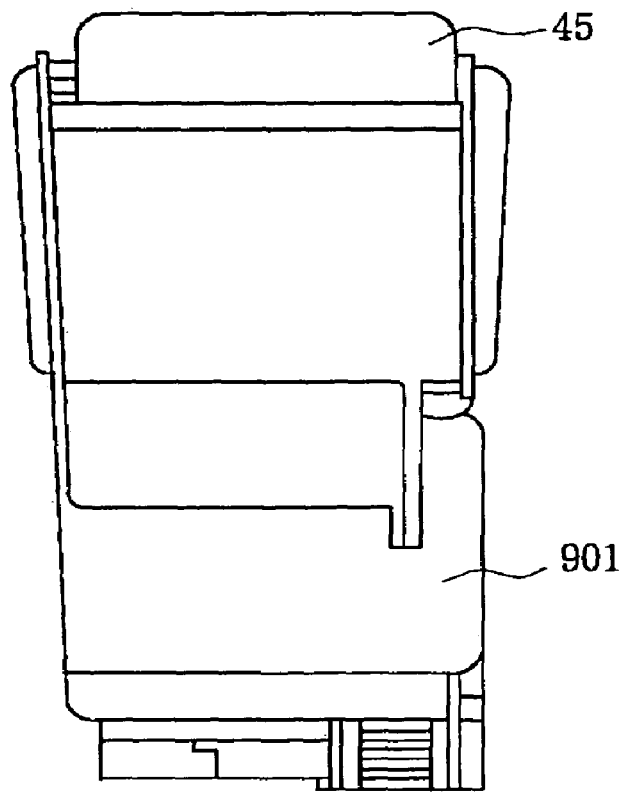
FIG. 6 is a schematic plan view showing a state where an ink cartridge is mounted on a recording head.

FIG. 5 shows an example of a member for supplying a recording head with an ink or a liquid composition containing no colorant, for example, a cartridge 45 storing an ink or a liquid composition to be supplied through a tube. Here, reference numeral 40 denotes a storage portion storing an ink or a liquid composition to be supplied such as a bag. A tip of the storage portion 40 is provided with a rubber stopper 42. A needle (not shown) is inserted into the stopper 42, whereby the ink or liquid composition in the bag 40 can be supplied to a head. Reference numeral 44 denotes an absorber for receiving a waste ink or a waste liquid composition. The storage portion 40 has a surface to be in contact with an ink or a liquid composition preferably formed of polyolefin, or particularly preferably formed of polyethylene. As shown in, for example, FIG. 6, the cartridge 45 is structured to be detachably attached to a recording head 901 for ejecting an ink or a liquid composition, and is structured such that an ink or a liquid composition is supplied to the recording head 901 in a state where the cartridge 45 is mounted on the recording head.

[Ink Properties; Ink Jet Ejection Property and Permeability into Recording Medium]

A set of a liquid composition and an ink according to the present invention is particularly preferably used for ink jet recording. Examples of an ink jet recording method include a recording method including applying mechanical energy on an ink to eject a droplet and a recording method including applying thermal energy to an ink to bubble the ink to thereby eject a droplet. Not only the ink of the present invention but also the liquid composition of the present invention can be used for those recording methods. At this time, the liquid composition and the ink having the constitutions according to the present invention each preferably have property with which the liquid composition or the ink can be ejected from an ink jet head. From the viewpoint of ejection property from an ink jet head, the properties of those liquids are preferably adjusted as follows. For example, the viscosity of each of those liquids is preferably adjusted to be 1 to 15 mPa·s and the surface tension thereof is preferably adjusted to be 25 mN/m (dyne/cm) or more; the viscosity is particularly preferably adjusted to be 1 to 5 mPa·s and the surface tension is particularly preferably adjusted to be 25 to 50 mN/m (dyne/cm). Furthermore, the liquid composition of the present invention needs to be caused to react only with a specific ink on a recording medium such as paper. Therefore, the surface tension of the liquid composition is preferably adjusted to be higher than that of an ink to be destabilized by the liquid composition to such an extent that the liquid composition can be ejected from an ink jet head in such a manner that the liquid composition does not spread to a portion other than a recording portion for the specific ink.

EXAMPLES

Hereinafter, the present invention will be described in more detail by way of examples and comparative examples. However, the present invention is not limited to the following examples within the gist of the present invention. The terms "part" and "%" in the following description mean "part by mass" and "mass %" unless otherwise stated.

[Evaluation of Liquid Composition]

(Preparation of Liquid Composition)

The constituents were mixed in accordance with Table 1 below, and the mixture was sufficiently stirred for dissolution. After that, the resultant solution was filtered through a microfilter having a pore size of 1 μm (manufactured by Fuji Photo Film Co., Ltd.) under pressure to prepare each of liquid compositions 1 to 7. The amounts of the constituents were expressed in mass % units.

Calcium nitrate tetrahydrate and Acetylenol EH in the liquid compositions each had a water retention ability of less than 5%.

(Evaluation of Curling Phenomenon)

Each of the resultant liquid compositions 1 to 7 was applied to a recording medium by using an ink jet recording apparatus having an on-demand type multi recording head for ejecting an ink by applying thermal energy in accordance with a recording signal to the ink. The ink jet recording apparatus used had an ejection amount of 2.8 pL per dot, a recording density of 2,400×1,200 dpi, and a driving frequency of 10 kHz as a driving condition. Each liquid composition was uniformly applied in an application amount of 2.4 g/m$^2$ on a A4 size PPC paper (manufactured by Canon Inc.). A method of evaluating curling phenomenon was as follows.

Method of Evaluating Curling Phenomenon

The curling amounts of a printed matter at a temperature of 24° C. and a humidity of 50% immediately (within 1 min), 1 hour, 1 day, 2 days, 3 days, and 7 days after printing were measured. The case where the paper of the printed matter curled in a concave direction was designated as '+' (plus curling phenomenon), while the case where the paper curled in a convex direction was designated as '−' (minus curling phenomenon). A distance between a tip of the curled paper and a ground surface of the paper was measured with a ruler. The curling phenomenon judgment criteria are as follows. Table 2 shows the results of the evaluation.

AA: Within±10 mm.

A: Greater than±10 mm, within±25 mm.

B: Greater than±25 mm, within±40 mm.

C: In condition that a tip of paper is warped to the inner side of the paper surface.

D: In condition that a tip of paper rounds to the inner side of the paper surface.

(Evaluation of Ejection Stability)

Each of the resultant liquid compositions 1 to 7 was applied to a recording medium by using an ink jet recording apparatus having an on-demand type multi recording head for ejecting an ink by applying thermal energy in accordance with a recording signal to the ink. The ink jet recording apparatus used had an ejection amount of 2.8 pL per dot, a recording density of 2,400×1,200 dpi, and a driving frequency of 10

TABLE 1

| | Difference in water retention ability | Molecular weight | Liquid composition | | | | | | |
| --- | --- | --- | --- | --- | --- | --- | --- | --- | --- |
| | | | 1 | 2 | 3 | 4 | 5 | 6 | 7 |
| Trimethylol propane | 18.0 | 134.2 | 16.0 | | | 15.0 | 10.0 | 15.0 | 15.0 |
| N,N'-bis-(2-hydroxyethyl)-urea | 27.4 | 148.2 | | 16.0 | 15.0 | | | | |
| Glycerin | 49.2 | 92.1 | 14.0 | 14.0 | 2.0 | 2.0 | 5.0 | 15.0 | |
| Ethylene urea | 52.4 | 86.1 | | | | | | | |
| Calcium nitrate tetrahydrate | — | — | 6.0 | 6.0 | 6.0 | 6.0 | 6.0 | 6.0 | 6.0 |
| Acetylenol EH(*) | — | — | 1.0 | 1.0 | 1.0 | 1.0 | 1.0 | 1.0 | 1.0 |
| Ion-exchanged water | — | — | 63.0 | 63.0 | 76.0 | 76.0 | 78.0 | 63.0 | 78.0 |
| Y/X | | | 0.88 | 0.88 | 0.13 | 0.13 | 0.50 | 1.00 | 0.00 |

(*)Acetylene glycol ethylene oxide adduct (surfactant) manufactured by Kawaken Fine Chemicals Co., Ltd.

kHz as a driving condition. Printing was conducted on a A4 size PPC paper (manufactured by Canon Inc.) at a printing duty of 100%. The printing performed was the two-path printing in which a printing region was scanned twice. In addition, in order to observe a printed state of an applied liquid composition, C.I. Direct Blue 199 was added as a coloring agent to the liquid composition. The coloring agent was added in a trace amount so as not to affect ejection property evaluation.

Method of Evaluating Ejection Stability 1 (Ejection Stability after Head has Been Left Standing)

Whether a problem such as nozzle clogging occurred was observed as evaluation of the above liquid compositions for ejection stability. The liquid composition was set in a head, and the head was left standing for one month, followed by printing. Then, the presence or absence of the disturbance, blurring, or the like of an image was observed. The criteria for evaluation of Ejection Stability 1 (ejection stability after a head has been left standing) are as follows. Table 2 shows the results of the evaluation.

A: No blurring is observed.
B: Slight blurring is observed, but is practically acceptable.
C: Blurring is observed, and causes a problem in an image.
D: Non-ejection is observed.

Method of Evaluating Ejection Stability 2 (Start-Up Property)

The presence or absence of the disturbance, blurring, or the like of a writing start part at the start of printing was observed in Environment 1 having normal temperature and normal humidity and Environment 2 of a temperature of 15° C. and a humidity of 10% as evaluation of any one of the above liquid compositions for ejection stability. The criteria for evaluation of Ejection Stability 2 (start-up property) are as follows. Table 2 shows the results of the evaluation.

A: No blurring is observed.
B: No blurring is observed, and an image is slightly disturbed but is practically acceptable.
C: A printing of initial portion blurs to cause a problem in an image.
D: A printing of initial portion largely blurs.

(Evaluation of Precipitation Property at Time of Evaporation of Water Content)

The constituents were mixed in accordance with Table 3 below, and the mixture was sufficiently stirred for dissolution. After that, the resultant solution was filtered through a microfilter having a pore size of 1 μm (manufactured by Fuji Photo Film Co., Ltd.) under pressure to prepare each of liquid compositions 8 and 9. The amounts of the constituents were expressed in mass % units.

TABLE 3

|  | Difference in water moisture retention ability | Molecular weight | Liquid composition 8 | Liquid composition 9 |
|---|---|---|---|---|
| Trimethylol propane | 18.0 | 134.2 | 16.0 | 16.0 |
| N,N'-bis-(2-hydroxyethyl)-urea | 27.4 | 148.2 |  |  |
| Glycerin | 49.2 | 92.1 | 14.0 |  |
| Ethylene urea | 52.4 | 86.1 |  | 14.0 |
| Calcium nitrate tetrahydrate | — | — | 18.0 | 18.0 |
| Acetylenol EH(*) | — | — | 1.0 | 1.0 |
| Ion-exchanged water | — | — | 51.0 | 51.0 |
| Y/X |  |  | 0.88 | 0.88 |

(*)Acetylene glycol ethylene oxide adduct (surfactant) manufactured by Kawaken Fine Chemicals Co., Ltd.

5 g of each of the resultant liquid compositions 8 and 9 and the liquid compositions 1 to 7 prepared above were charged into a dish. After the dish had been left standing in an environment of a temperature of 25° C. and a humidity of 30% for 30 days, the state of the liquid composition was observed with the eyes. Precipitation property at the time of evaporation of moisture in the liquid composition was evaluated. Table 4 shows the results of the evaluation.

TABLE 4

| Liquid composition | Presence or absence of precipitate |
|---|---|
| 1 | Absent |
| 2 | Absent |

TABLE 2

|  |  | Curling phenomenon evaluation | | | | | | | Ejection Stability 2 | |
|---|---|---|---|---|---|---|---|---|---|---|
|  | Liquid composition | Immediately after printing | After 1 hour | After 1 day | After 2 days | After 3 days | After 7 days | Ejection Stability 1 | Environment 1 | Environment 2 |
| Example |  |  |  |  |  |  |  |  |  |  |
| 1 | 1 | AA | AA | AA | A | A | B | B | B | D |
| 2 | 2 | AA | AA | AA | A | A | B | B | B | C |
| 3 | 3 | AA | AA | A | A | A | A | B | B | B |
| 4 | 4 | AA | AA | A | A | A | A | B | B | D |
| Comparative Example |  |  |  |  |  |  |  |  |  |  |
| 1 | 5 | A | A | B | B | B | C | B | B | D |
| 2 | 6 | AA | A | A | B | C | C | B | B | D |
| Reference Example |  |  |  |  |  |  |  |  |  |  |
| 1 | 7 | AA | AA | AA | A | A | A | D | B | D |

TABLE 4-continued

| Liquid composition | Presence or absence of precipitate |
|---|---|
| 3 | Absent |
| 4 | Absent |
| 5 | Absent |
| 6 | Absent |
| 7 | Present |
| 8 | Absent |
| 9 | Present |

[Curling Phenomenon Evaluation of Recorded Product Obtained by Using Two-Liquid System]

Next, curling phenomenon of a recorded product obtained by using a system (two-liquid system) in which ink was applied after a liquid composition had been applied was observed.

(Preparation of Ink)

The following pigment dispersions 1 and 2 were prepared. The resultant pigment dispersions 1 and 2 were used to prepare pigment inks. For preparing the pigment inks, the constituents were mixed in accordance with Table 5 below, and the mixture was sufficiently stirred. After that, the resultant solution was filtered through a microfilter having a pore size of 0.3 μm (manufactured by Fuji Photo Film Co., Ltd.) under pressure to prepare each of inks 1 to 3.

Pigment Dispersion 1

10 parts of Monarch 880 (manufactured by Cabot Corporation) as a pigment, 40 parts of an anionic polymer P-1 (styrene/M230G (methoxypolyethylene glycol methacrylate: manufactured by Shin-Nakamura Chemical Co., Ltd.)/acrylic acid copolymer (copolymerization ratio (mass ratio)=65/12/25), acid value 160, weight average molecular weight 8,000, aqueous solution having a solid content of 10% (neutralizer: potassium hydroxide)), and 50 parts of pure water were mixed, and the mixture was fed into a batch-type vertical sand mill (manufactured by AIMEX Co., Ltd.). Then, 250 parts of zirconia beads having a diameter of 0.3 mm were fed into the sand mill, and the whole was subjected to dispersion treatment for 10 hours while being cooled with water. Furthermore, the dispersion was subjected to a centrifugal separator to remove coarse particles. Then, a pigment dispersion 1 having a solid content of about 14.0% and a weight average particle size of 110 nm was produced as a finally prepared product.

Pigment Dispersion 2

10 parts of Monarch 880 (manufactured by Cabot Corporation) as a pigment, 40 parts of an anionic polymer P-2 (styrene/acrylic acid copolymer (copolymerization ratio (mass ratio)=70/30), acid value 180, weight average molecular weight 10,000, aqueous solution having a solid content of 10%, neutralizer: potassium hydroxide) and 50 parts of pure water were mixed, and the mixture was fed into a batch-type vertical sand mill (manufactured by AIMEX Co., Ltd.). Then, 150 parts of zirconia beads having a diameter of 0.3 mm were fed into the sand mill, and the whole was subjected to dispersion treatment for 10 hours while being cooled with water. Furthermore, the dispersion was subjected to a centrifugal separator to remove coarse particles. Then, a pigment dispersion having a solid content of about 14% and a weight average particle size of 110 nm was produced as a finally prepared product. 30 parts of an anionic polymer P-3 (ethyl acrylate/acrylic acid copolymer (copolymerization ratio (mass ratio) =87/13), acid value 100, weight average molecular weight 11,000, aqueous solution having a solid content of 10% (neutralizer: potassium hydroxide)) were added to the dispersing element to produce a pigment dispersion 2.

TABLE 5

| | Difference in water moisture retention ability | Molecular weight | Ink 1 | Ink 2 | Ink 3 |
|---|---|---|---|---|---|
| Pigment dispersion 1 | — | — | 40.0 | 40.0 | |
| Pigment dispersion 2 | — | — | | | 40.0 |
| Polyethylene glycol 1000 | 18.9 | 1000 | 5.0 | 5.0 | 5.0 |
| Glycerin | 49.2 | 92.1 | 5.0 | | |
| Diethylene glycol | 39.7 | 118.2 | 5.0 | 7.5 | 7.5 |
| Trimethylol propane | 18.0 | 134.2 | | 3.0 | 3.0 |
| Acetylenol EH(*) | — | — | 1.0 | 1.0 | 1.0 |
| Ion-exchanged water | — | — | 44.0 | 43.5 | 43.5 |

(*)Acetylene glycol ethylene oxide adduct (surfactant) manufactured by Kawaken Fine Chemicals Co., Ltd.

(Production of Recorded Product by Using Two-Liquid System)

The liquid composition 8 was applied to a recording medium by means of roller coating using an application roller having the structure shown in FIG. 1. The speed of the roller and the pressure of contact between the roller and the recording medium were adjusted in such a manner that the amount of the liquid composition applied to the recording medium was 2.4 g/m². In addition, PB paper (A4 size) manufactured by Canon Inc. was used as the recording medium.

Immediately after the application of the liquid composition, each of the inks 1 to 3 was applied by using an ink jet recording apparatus having an on-demand type multi recording head for ejecting an ink by applying thermal energy in accordance with a recording signal to the ink, and the following evaluation was performed. The ink jet recording apparatus used had an ejection amount of 2.8 pL per dot, a recording density of 2,400×1,200 dpi, and a driving frequency of 10 kHz as a driving condition. Printing was conducted on the recording medium to which the liquid composition 8 had been applied at a printing duty of 100%. The printing performed was two-path printing in which a printing region was scanned twice.

(Reactivity Between Ink and Liquid Composition)

The following sets of liquid compositions and inks were used, and were mixed under the following condition. The absorbance was measured to evaluate and reactivity was evaluated. Table 6 below shows the results.

Taking as (A) an absorbance at 550 nm of a mixture of 50 g of a 800-times diluted aqueous solution of a liquid composition and 0.3 g of a 5-times diluted aqueous solution of an ink was filtered through a filter of 0.2 μm 15 minutes after preparation of the mixture and as (B) an absorbance at 550 nm of a mixed solution of 0.3 g of a 5-times diluted aqueous solution of the ink and 50 g of pure water, the value of (A)/(B) as an indication of reactivity was determined.

TABLE 6

| Liquid composition | Ink | Reactivity (A)/(B) |
|---|---|---|
| 8 | 1 | 0.38 |
| 8 | 2 | 0.38 |
| 8 | 3 | 0.78 |

(Evaluation of Curling Phenomenon)

The method of evaluating curling phenomenon was the same as that in the case where a liquid composition was used. Table 7 below shows the results of the evaluation.

TABLE 7

| | Liquid compo-sition | Ink | Curling phenomenon evaluation | | | | |
|---|---|---|---|---|---|---|---|
| | | | After 1 hour | After 1 day | After 2 days | After 3 days | After 7 days |
| Example | | | | | | | |
| 5 | 8 | 1 | A | B | B | B | C |
| 6 | 8 | 2 | A | A | A | B | C |
| 7 | 8 | 3 | A | B | B | C | C |
| Reference example | | | | | | | |
| 2 | 8 | — | AA | AA | A | A | B |
| 3 | — | 1 | B | C | C | C | D |
| 4 | — | 2 | B | B | B | C | D |
| 5 | — | 3 | B | B | B | C | D |

The results of the evaluation of curling phenomenon of Reference Example 2 up to 1 day after printing were better than those of Example 4.

This application claims priority from Japanese Patent Application Nos. 2004-075382 filed Mar. 16, 2004 and 2005-070016 filed Mar. 11, 2005 which are hereby incorporated by reference herein.

What is claimed is:

1. A liquid composition for use in an image recording method comprising the steps of:
applying an ink containing a colorant in a dissolved state or a dispersed state to a recording medium; and
applying to the recording medium a liquid composition that destabilizes the dissolved state or the dispersed state of the colorant in the ink by coming into contact with the ink,
the liquid composition comprising at least a polyvalent metal ion, water, a water-soluble organic compound 1, and a water-soluble organic compound 2,
wherein a content X (mass %) of the water-soluble organic compound 1 is 15 mass % or more with respect to a total amount of the liquid composition,
wherein the content X (mass %) of the water-soluble organic compound 1 with respect to the total amount of the liquid composition and a content Y (mass %) of the water-soluble organic compound 2 with respect to the total amount of the liquid composition satisfy the following relationship:

$0 < Y/X \leq 0.9$ wherein the water-soluble organic compound 1 is a water-retentive, water-soluble organic compound having a difference between a water retention ability in an environment of a temperature of 23° C. and a humidity of 45% and a water retention ability in an environment of a temperature of 30° C. and a humidity of 80% of 36% or less,
wherein the water-soluble organic compound 1 is selected from the group consisting of:
a polyethylene glycol, a polyhydric alcohol compound that is trihydric, and N,N-bis(2-hydroxyethyl)-urea,
wherein the water-soluble organic compound 2 is a water-soluble organic compound other than the colorant or the water-soluble organic compound 1,
wherein the polyvalent metal ion in the liquid composition is a divalent metal ion.

2. The liquid composition according to claim 1, wherein the content Y (mass %) of the water-soluble organic compound 2 with respect to the total amount of the liquid composition is Y<15 mass %.

3. The liquid composition according to claim 1, wherein the water-soluble organic compound 1 has a molecular weight Mw in a range of $100 \leq Mw \leq 1,000$.

4. The liquid composition according to claim 1, wherein at least one of the water-soluble organic compound 1 and the water-soluble organic compound 2 is in a liquid state at ordinary temperature (25° C.).

5. A set of a liquid composition and an ink, comprising the liquid composition according to claim 1.

6. An ink jet recording apparatus comprising the liquid composition according to claim 1 and an ink.

7. An image forming method comprising the steps of:
applying an ink containing a colorant in a dissolved state or a dispersed state to a recording medium; and
applying to the recording medium a liquid composition that destabilizes the dissolved state or the dispersed state of the colorant in the ink by coming into contact with the ink,
wherein the liquid composition includes at least a polyvalent metal ion, water, a water-soluble organic compound 1, and a water-soluble organic compound 2,
wherein a content X (mass %) of the water-soluble organic compound 1 is 15 mass % or more with respect to a total amount of the liquid composition,
wherein the content X (mass %) of the water-soluble organic compound 1 with respect to the total amount of the liquid composition and a content Y (mass %) of the water-soluble organic compound 2 with respect to the total amount of the liquid composition satisfy the following relationship:

$0 < Y/X \leq 0.9$ wherein the water-soluble organic compound 1 is a water-retentive, water-soluble organic compound having a difference between a water retention ability in an environment of a temperature of 23° C. and a humidity of 45% and a water retention ability in an environment of a temperature of 30° C. and a humidity of 80% of 36% or less,
wherein the water-soluble organic compound 1 is selected from the group consisting of:
a polyethylene glycol, a polyhydric alcohol compound that is trihydric, and N,N-bis(2-hydroxyethyl)-urea,
wherein the water-soluble organic compound 2 is a water-soluble organic compound other than the colorant or the water-soluble organic compound 1,
wherein the polyvalent metal ion in the liquid composition is a divalent metal ion.

8. The image forming method according to claim 7, wherein the content Y (mass %) of the water-soluble organic compound 2 with respect to the total amount of the liquid composition is Y<15 mass %.

9. The image forming method according to claim 7, wherein the water-soluble organic compound 1 has a molecular weight Mw in a range of $100 \leq Mw \leq 1,000$.

10. The image forming method according to claim 7, wherein at least one of the water-soluble organic compound 1 and the water-soluble organic compound 2 is in a liquid state at room temperature (25° C.).

11. The liquid composition according to claim 1, wherein the water-soluble organic compound 1 is selected from the group consisting of: a polyethylene glycol having an average molecular weight of 200, 300, 600, or 1,000, 1,2,6-hexanetriol, trimethylol propane, trimethylol ethane, and N,N-bis-(2-hydroxyethyl)-urea.

12. The image forming method according to claim 7, wherein the water-soluble organic compound 1 is selected from the group consisting of: a polyethylene glycol having an average molecular weight of 200, 300, 600, or 1,000, 1,2,6-hexanetriol, trimethylol propane, trimethylol ethane, and N,N-bis-(2-hydroxyethyl)-urea.

* * * * *